(12) United States Patent
Kim et al.

(10) Patent No.: US 8,406,185 B2
(45) Date of Patent: Mar. 26, 2013

(54) METHOD AND APPARATUS FOR TRANSMITTING PILOT IN A WIRELESS COMMUNICATION SYSTEM

(75) Inventors: Dong Cheol Kim, Anyang-si (KR); Han Gyu Cho, Anyang-si (KR); Wook Bong Lee, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 687 days.

(21) Appl. No.: 12/683,275

(22) Filed: Jan. 6, 2010

(65) Prior Publication Data
US 2010/0177723 A1 Jul. 15, 2010

Related U.S. Application Data

(60) Provisional application No. 61/142,642, filed on Jan. 6, 2009, provisional application No. 61/152,258, filed on Feb. 13, 2009, provisional application No. 61/241,031, filed on Sep. 10, 2009, provisional application No. 61/254,752, filed on Oct. 26, 2009.

(51) Int. Cl.
*H04W 4/00* (2009.01)
*H04B 7/208* (2006.01)
*H04B 15/00* (2006.01)
*H04K 1/10* (2006.01)
*H04J 11/00* (2006.01)

(52) U.S. Cl. ........ 370/329; 370/330; 370/344; 370/206; 375/260; 375/285

(58) Field of Classification Search ................. 370/206, 370/208, 491, 500, 310–350; 375/260, 285
See application file for complete search history.

(56) References Cited

U.S. PATENT DOCUMENTS

| | | | |
|---|---|---|---|
| 2008/0253279 A1* | 10/2008 | Ma et al. | 370/206 |
| 2008/0298490 A1* | 12/2008 | Yun et al. | 375/260 |
| 2009/0225722 A1* | 9/2009 | Cudak et al. | 370/330 |

* cited by examiner

*Primary Examiner* — Ian N Moore
*Assistant Examiner* — Kiet Tang
(74) *Attorney, Agent, or Firm* — Lee, Hong, Degerman, Kang & Waimey

(57) ABSTRACT

An apparatus for transmitting a pilot and method thereof are disclosed, by which a pilot can be efficiently transmitted in a wireless communication system. The present invention, in which the resource unit is transmitted by a base station in a wireless communication system, includes forming the resource unit including a plurality of pilot resource elements (REs) and a plurality of data resource elements, allocating a plurality of pilot pairs to have a prescribed subcarrier interval and a prescribed OFDM (orthogonal frequency division multiplexing) symbol interval within the resource unit, and transmitting the resource unit to a user equipment via multi-antenna, wherein each of a plurality of the pilot pairs includes individual pilots for two different streams or antennas.

14 Claims, 40 Drawing Sheets

FIG. 4
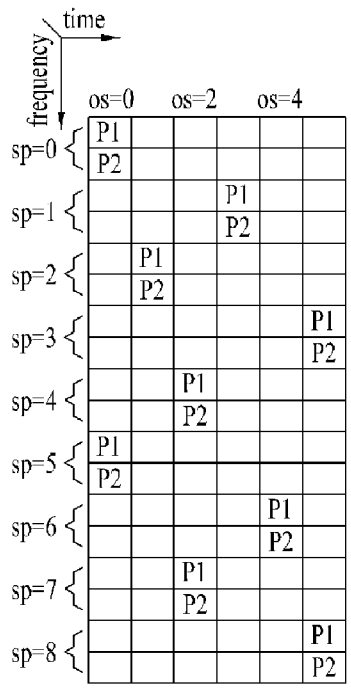
Pattern 1-1
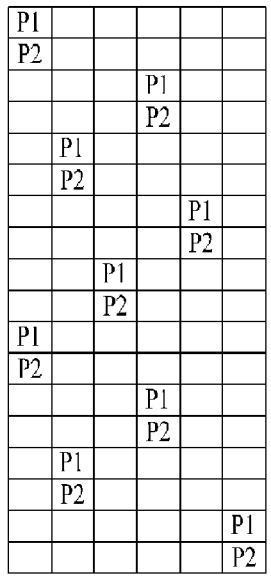
Pattern 1-2
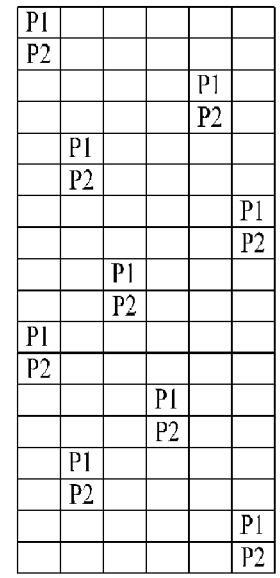
Pattern 1-3
FIG. 5
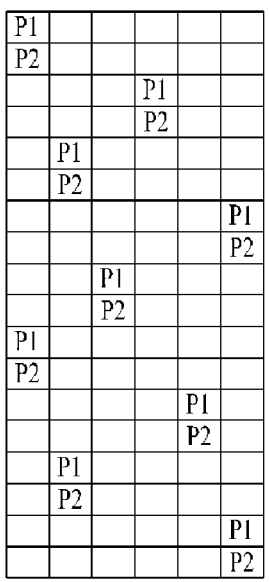
Pattern 1-4
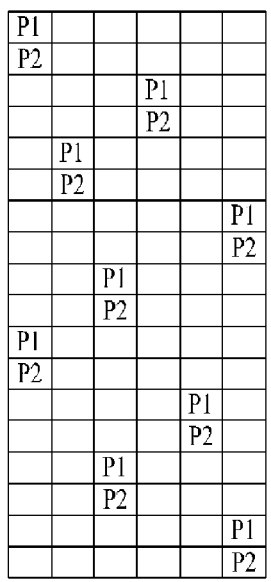
Pattern 1-5
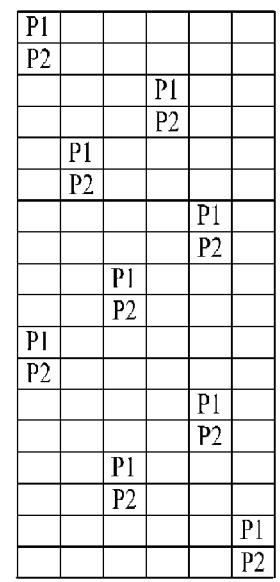
Pattern 1-6

FIG. 6
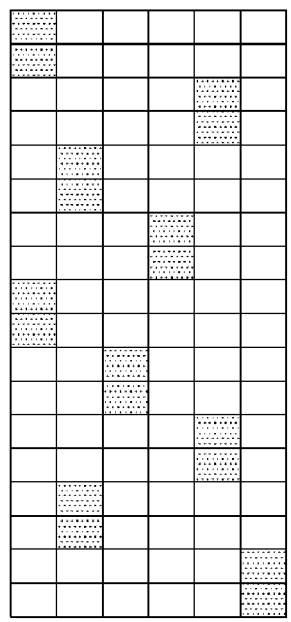
Pattern 1-7
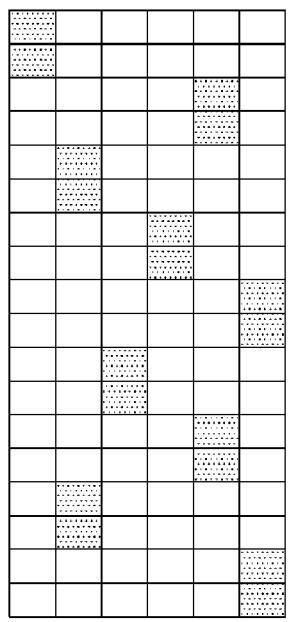
Pattern 1-8
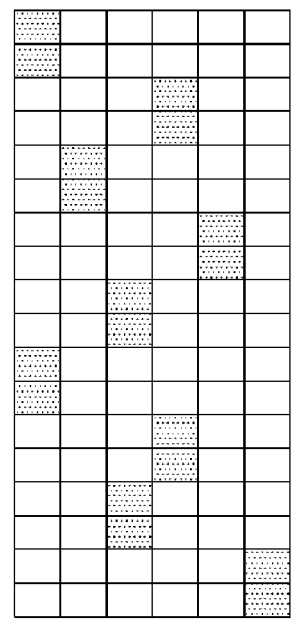
Pattern 1-9
FIG. 7
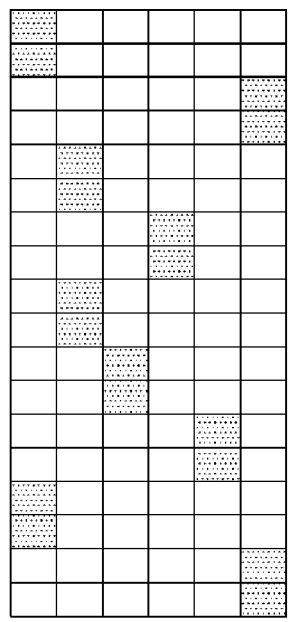
Pattern 1-10
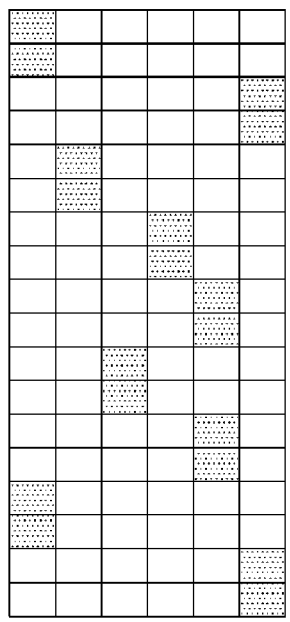
Pattern 1-11
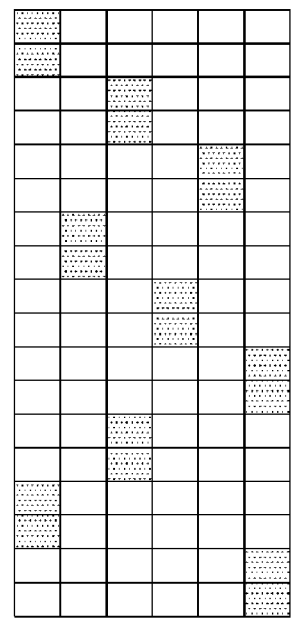
Pattern 1-12

Pattern 1-13　　　Pattern 1-14　　　Pattern 1-15　　　Pattern 1-16

Pattern 1-17　　　Pattern 1-18　　　Pattern 1-19　　　Pattern 1-20

FIG. 10
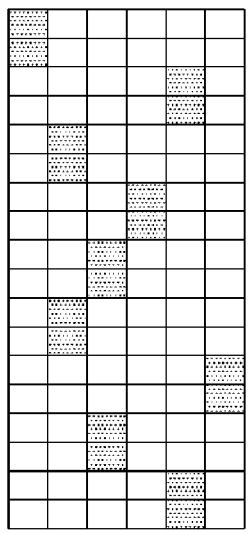
Pattern 1-21
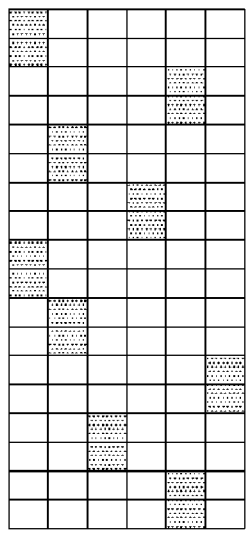
Pattern 1-22
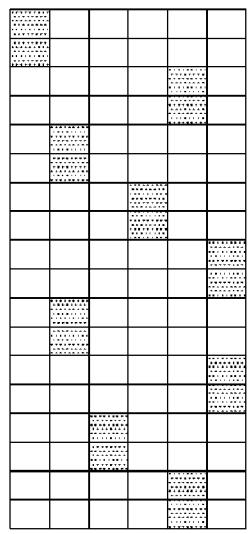
Pattern 1-23
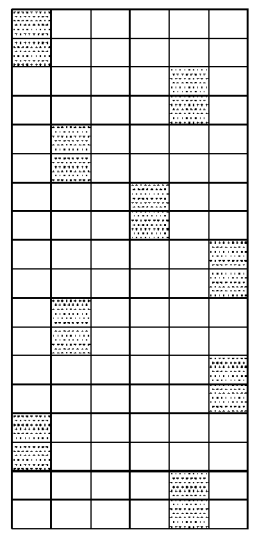
Pattern 1-24
FIG. 11
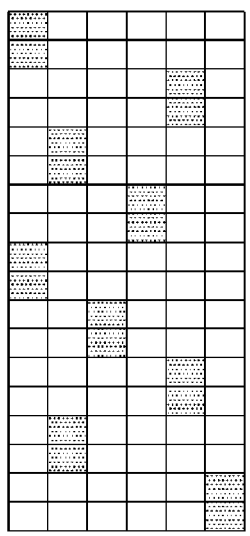
Pattern 1-25
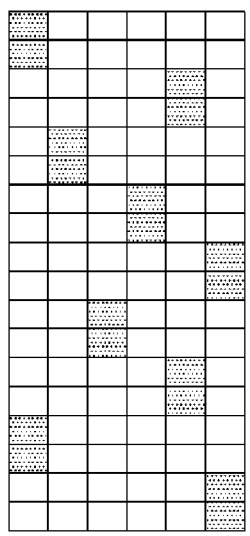
Pattern 1-26
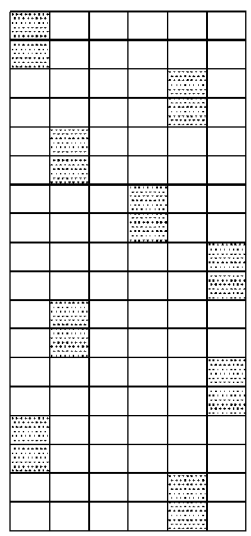
Pattern 1-27
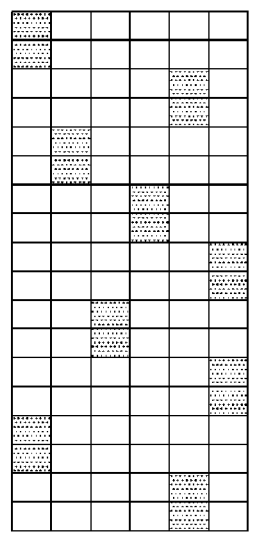
Pattern 1-28

FIG. 12
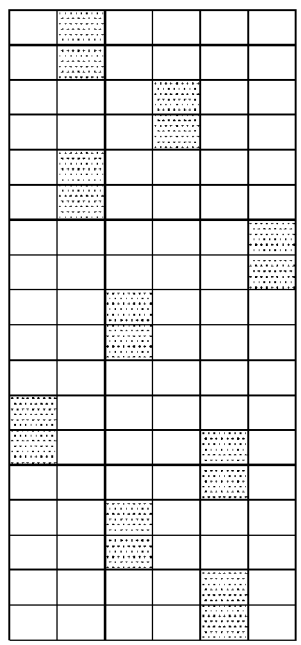
Pattern 1-29
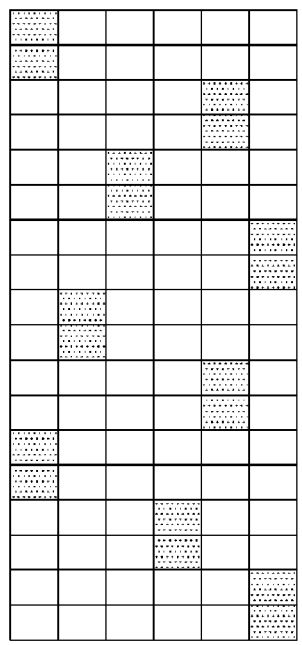
Pattern 1-30
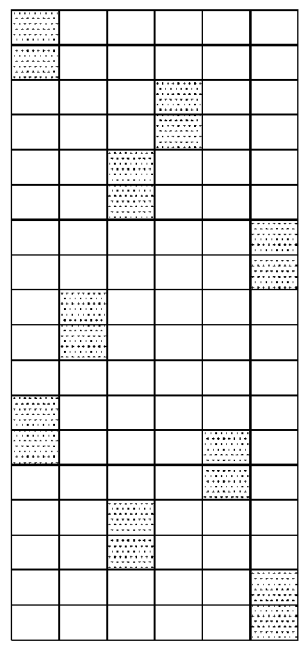
Pattern 1-31
FIG. 13
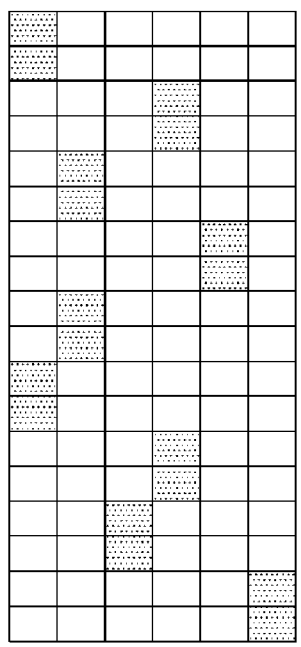
Pattern 1-32
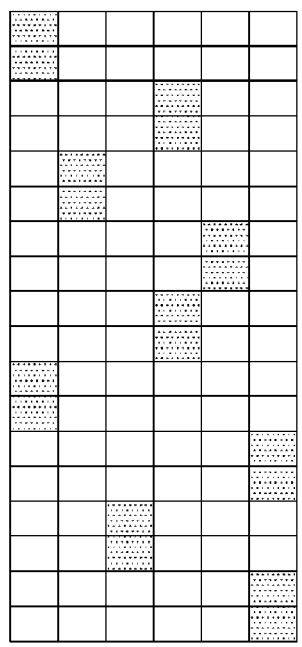
Pattern 1-33
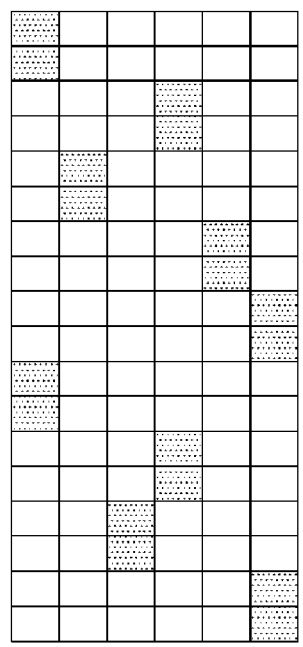
Pattern 1-34

FIG. 14
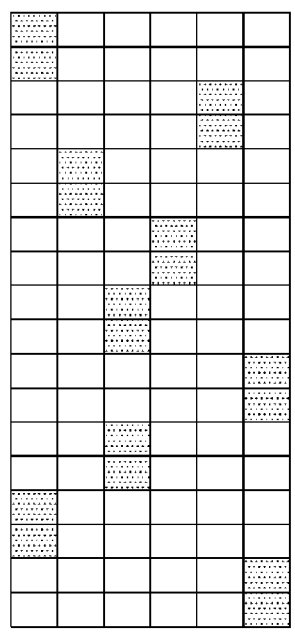
Pattern 1-35
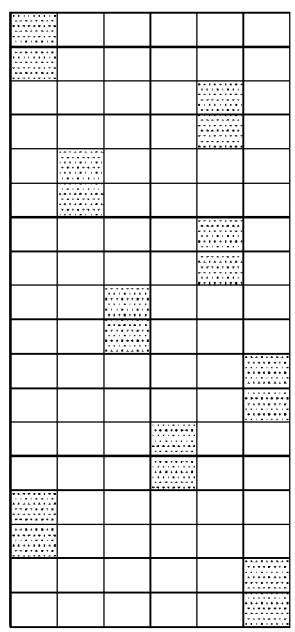
Pattern 1-36
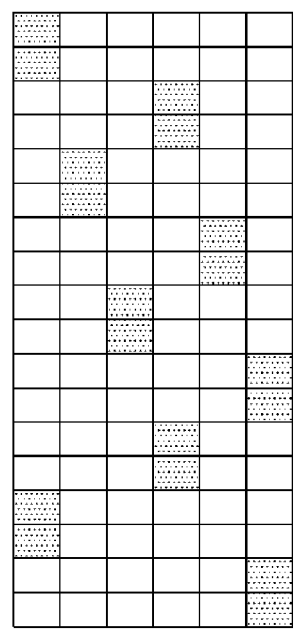
Pattern 1-37
FIG. 15
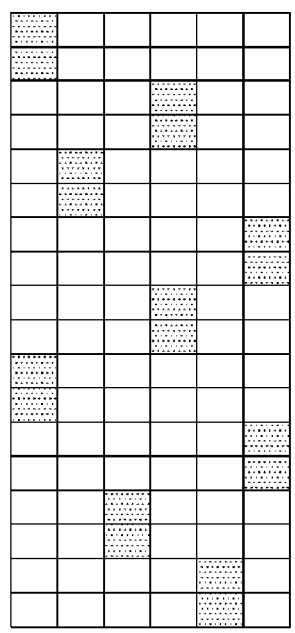
Pattern 1-38
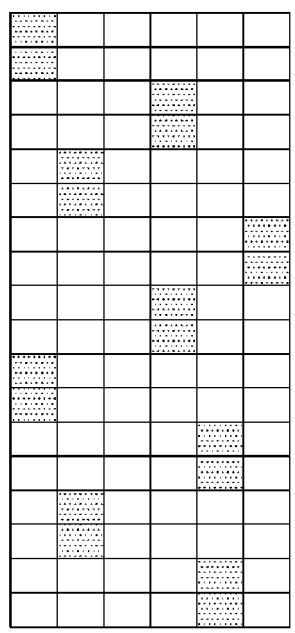
Pattern 1-39
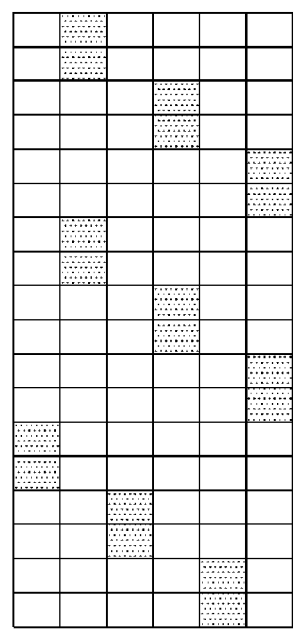
Pattern 1-40

FIG. 16
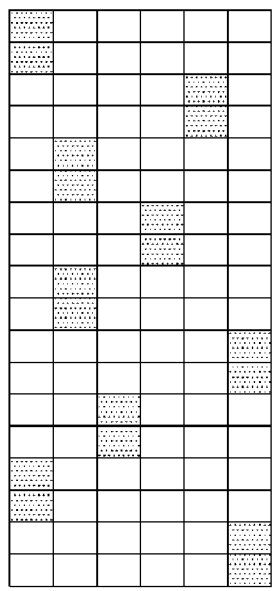
Pattern 1-41
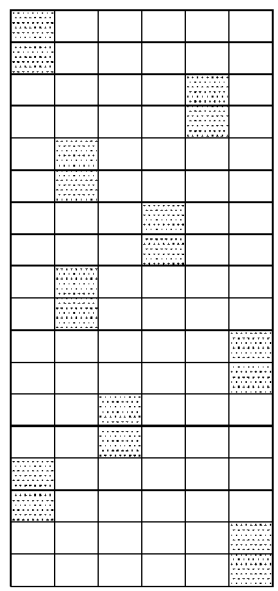
Pattern 1-42
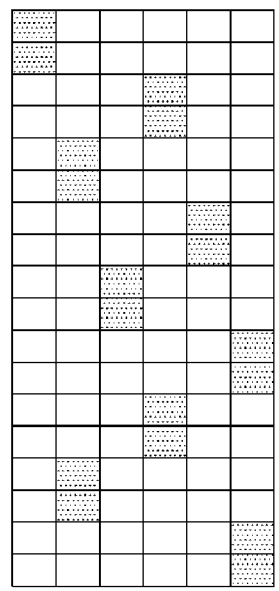
Pattern 1-43
FIG. 17
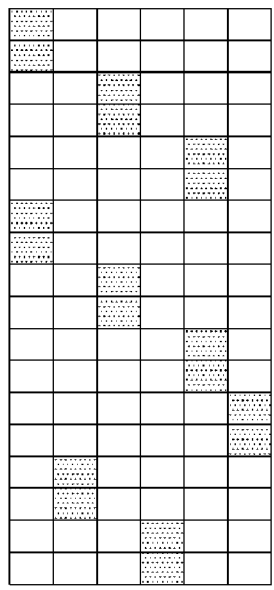
Pattern 1-44
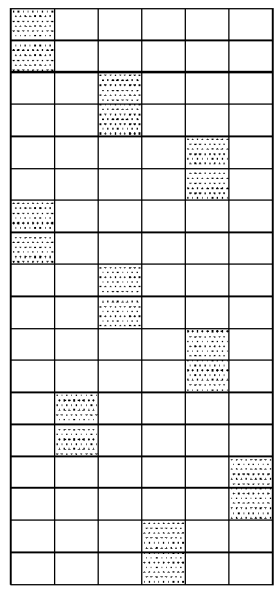
Pattern 1-45
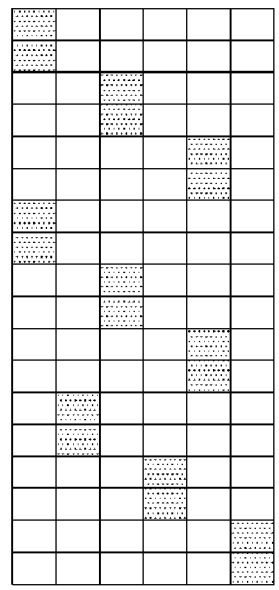
Pattern 1-46

FIG. 18
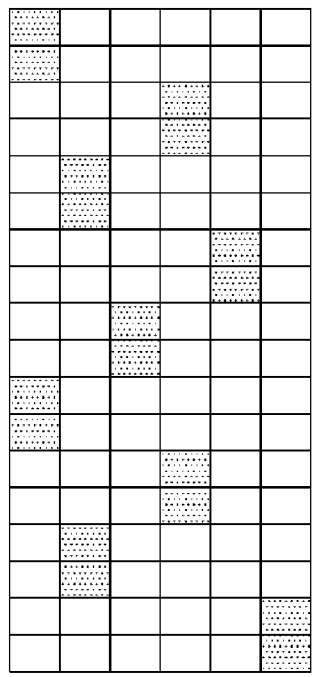
Pattern 1-47
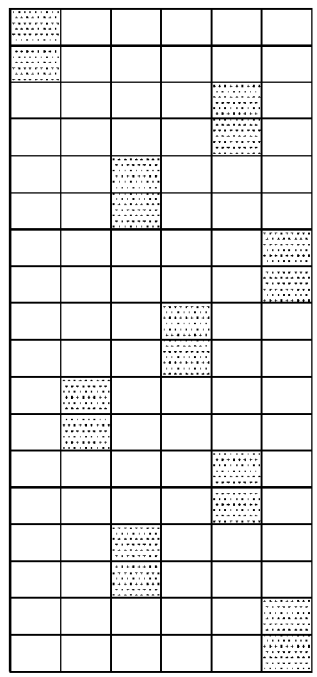
Pattern 1-48
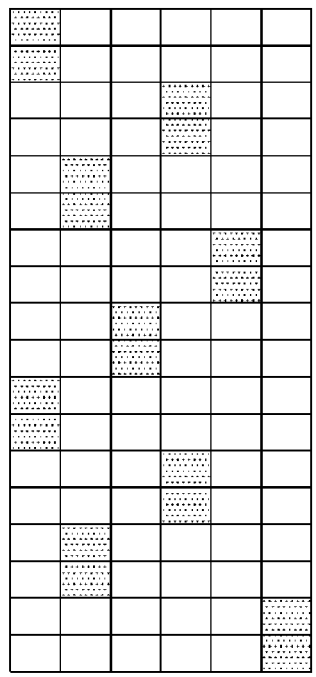
Pattern 1-49
FIG. 19
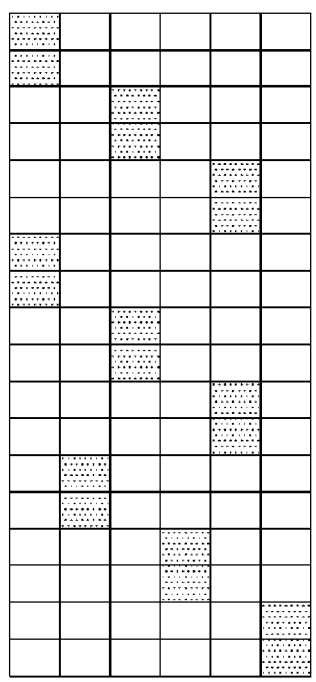
Pattern 1-50
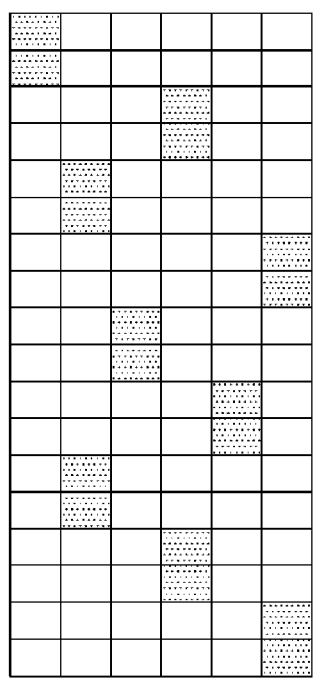
Pattern 1-51
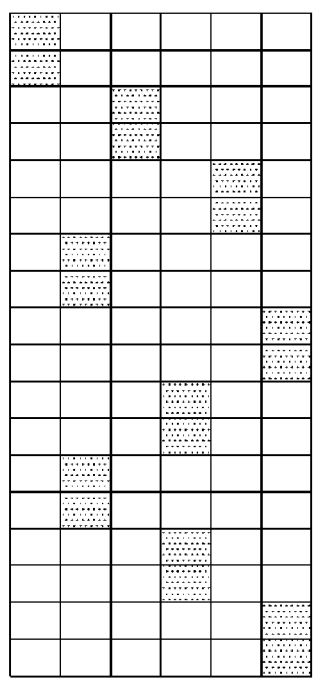
Pattern 1-52

FIG. 20
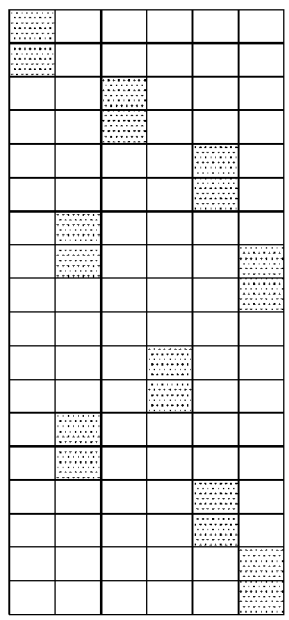
Pattern 1-53
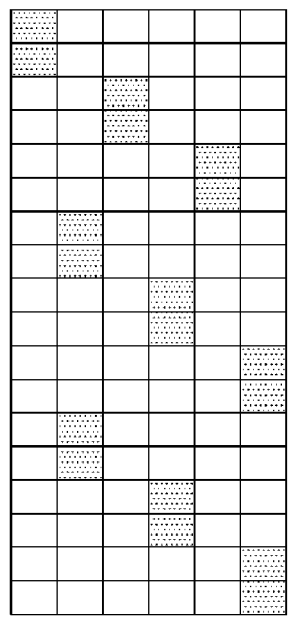
Pattern 1-54
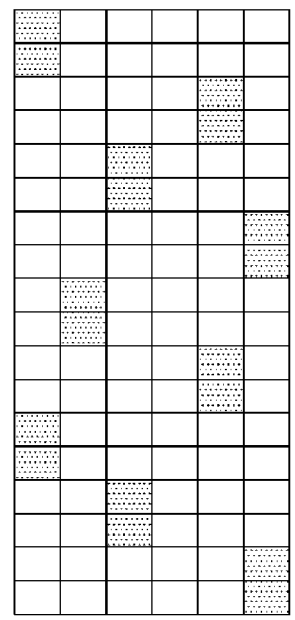
Pattern 1-55
FIG. 21
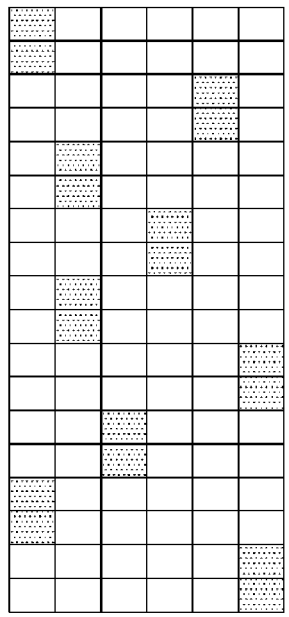
Pattern 1-56

FIG. 22

Pattern 2-1

Pattern 2-2

FIG. 23

Pattern 2-3

Pattern 2-4

Pattern 2-5

FIG. 24
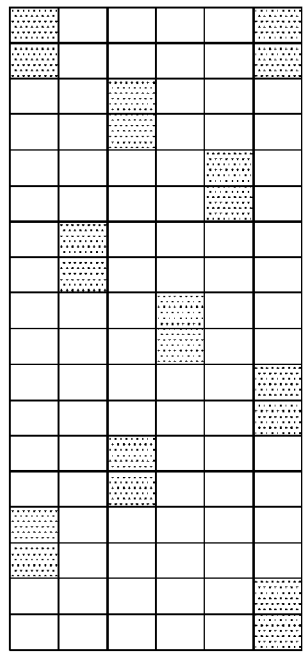
Pattern 2-6
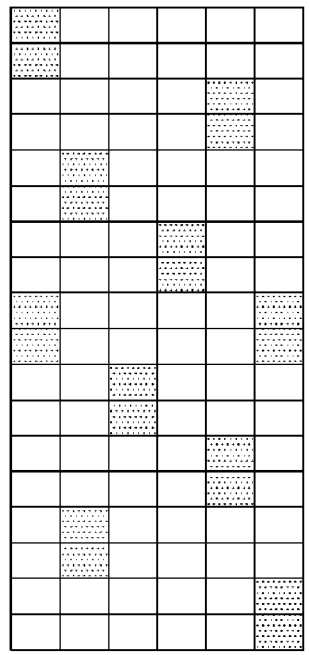
Pattern 2-7
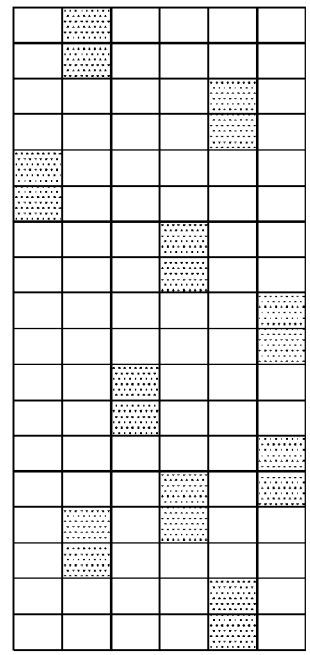
Pattern 2-8
FIG. 25
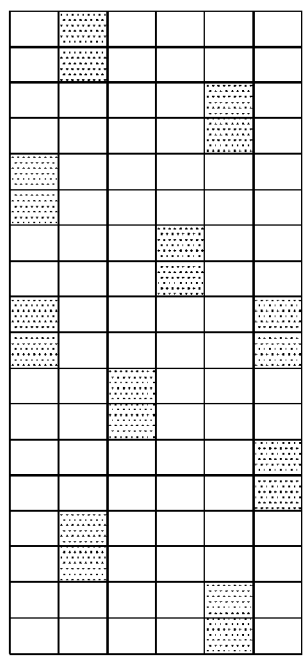
Pattern 2-9
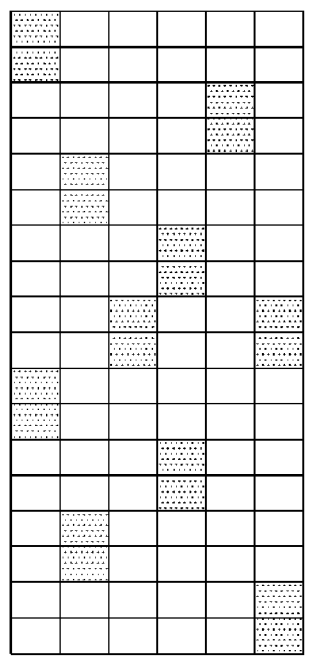
Pattern 2-10
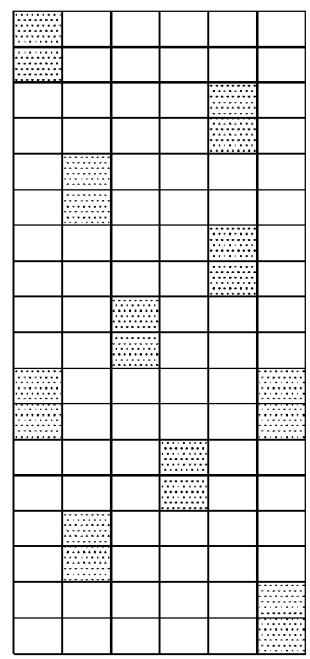
Pattern 2-11

FIG. 26
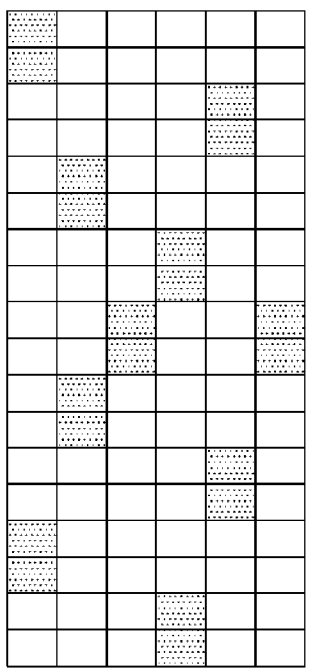
Pattern 2-12
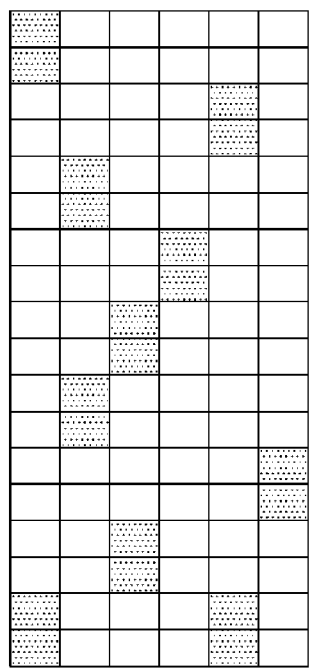
Pattern 2-13
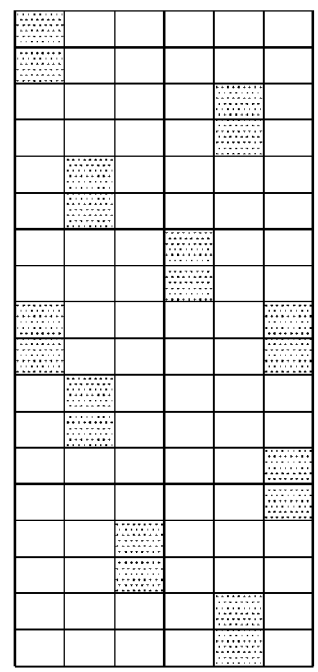
Pattern 2-14
FIG. 27
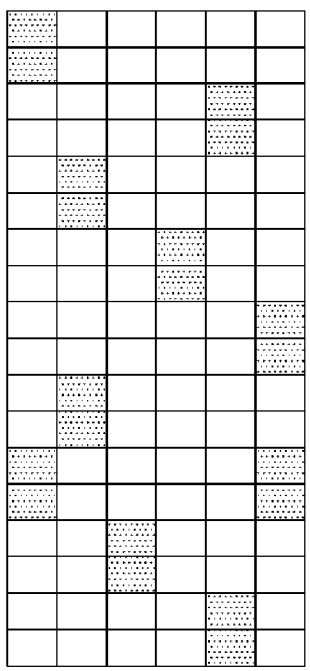
Pattern 2-15
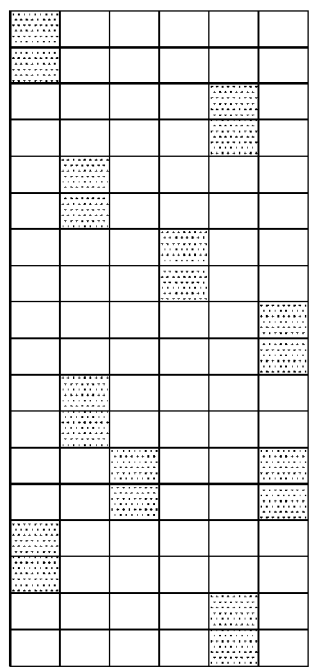
Pattern 2-16
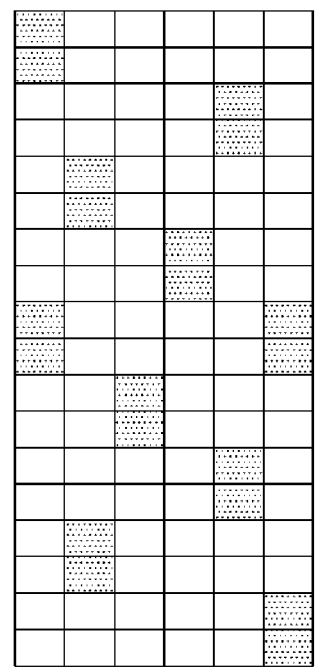
Pattern 2-17

FIG. 28
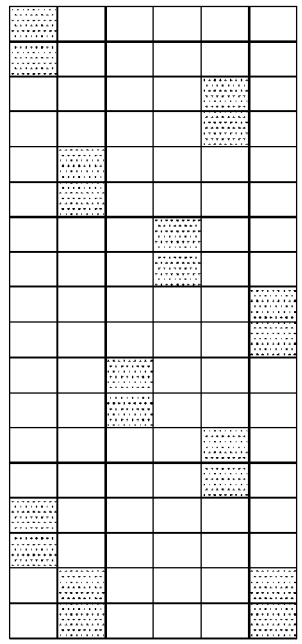
Pattern 2-18
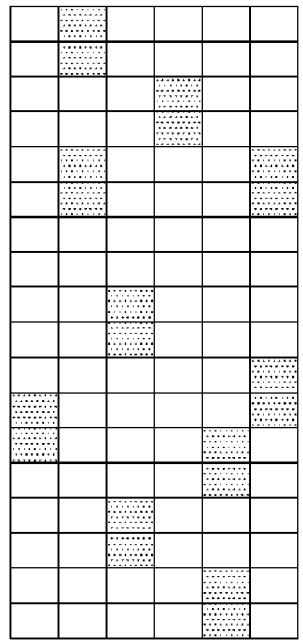
Pattern 2-19
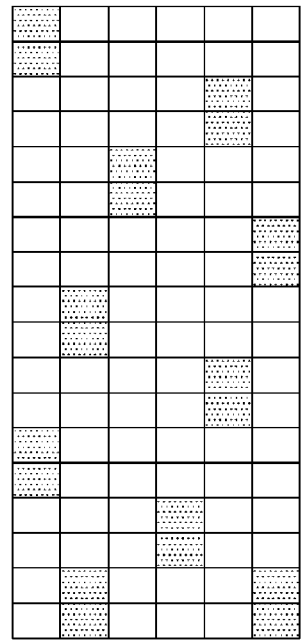
Pattern 2-20
FIG. 29
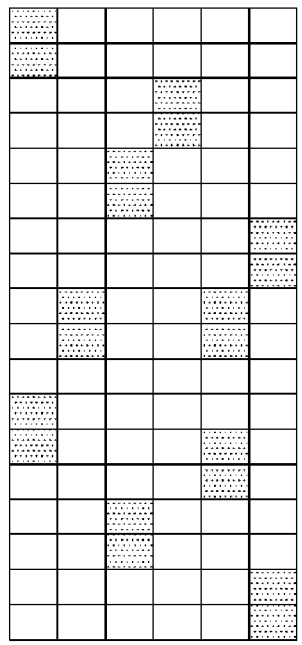
Pattern 2-21
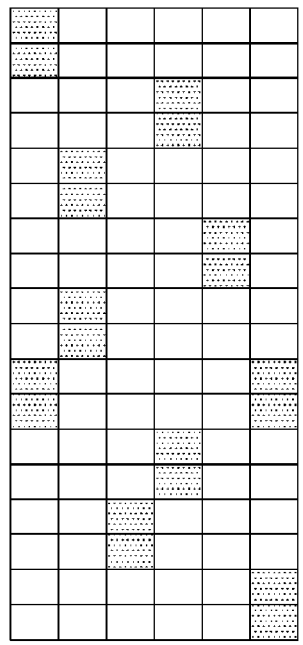
Pattern 2-22
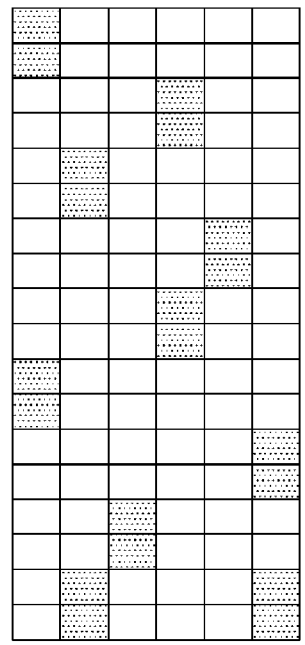
Pattern 2-23

FIG. 30
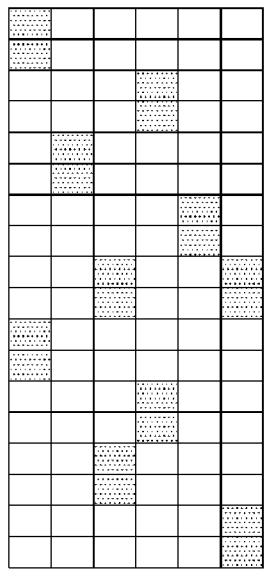
Pattern 2-24
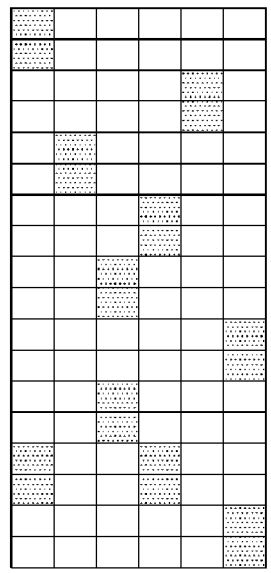
Pattern 2-25
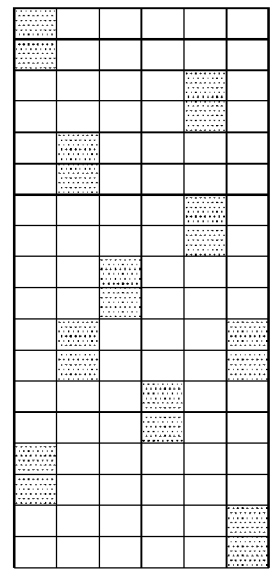
Pattern 2-26
FIG. 31
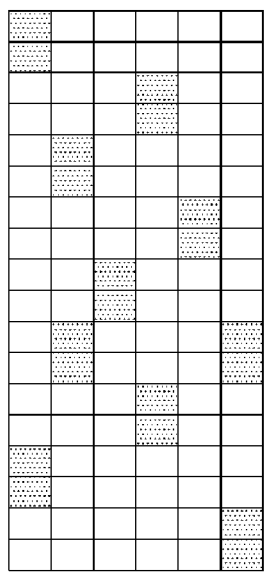
Pattern 2-27
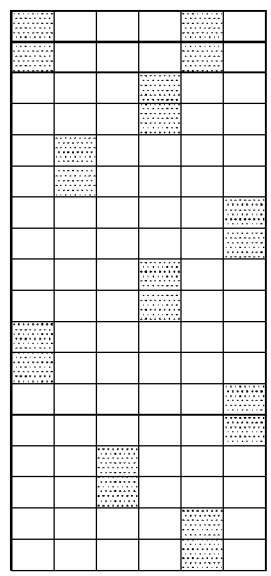
Pattern 2-28
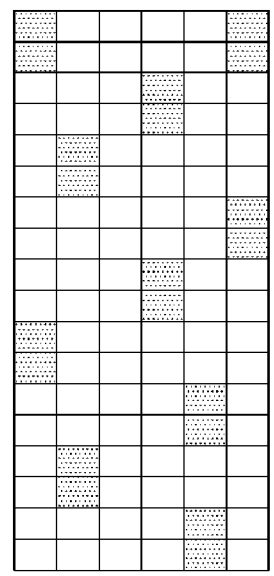
Pattern 2-29

FIG. 32
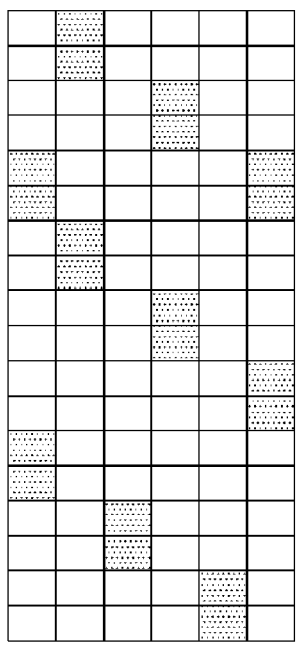
Pattern 2-30
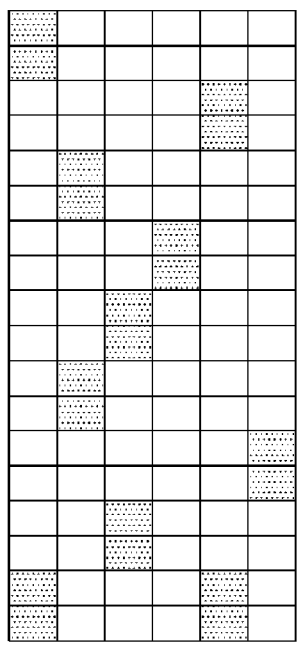
Pattern 2-31
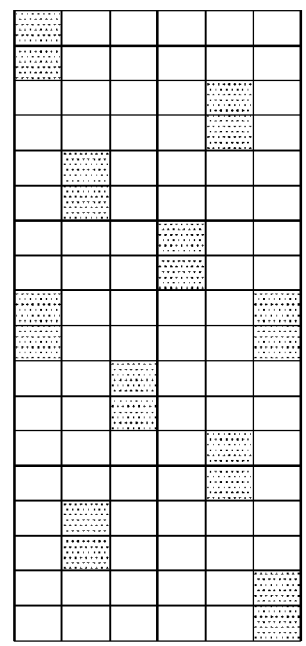
Pattern 2-32
FIG. 33
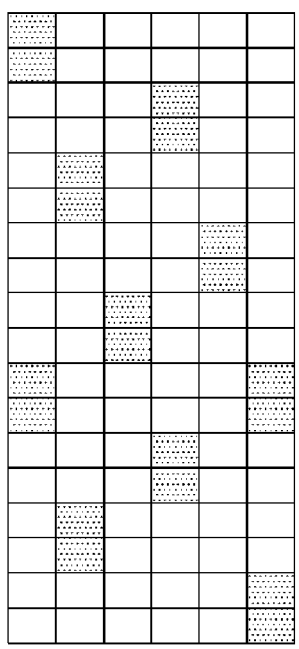
Pattern 2-33
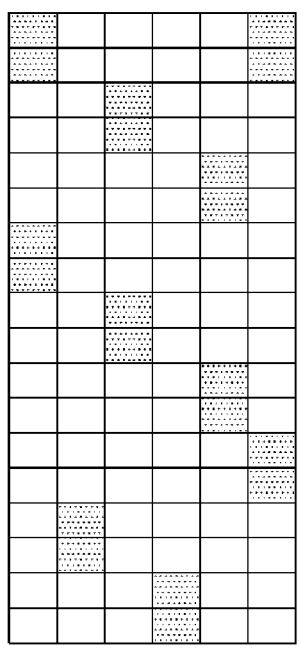
Pattern 2-34
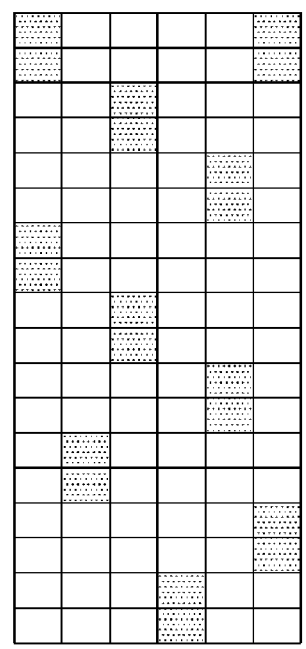
Pattern 2-35

FIG. 34
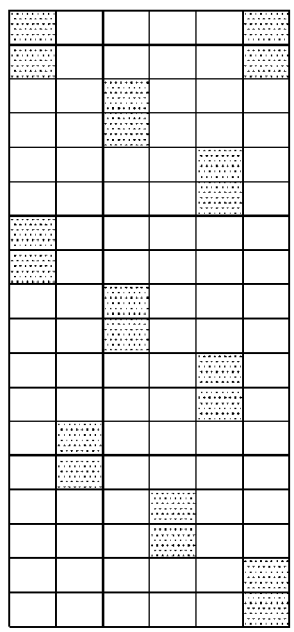
Pattern 2-36
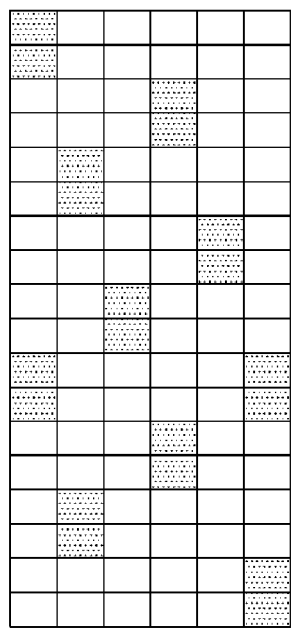
Pattern 2-37
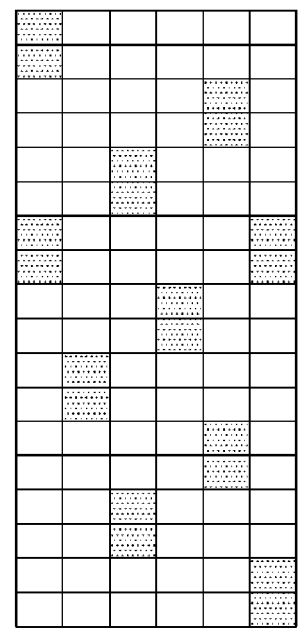
Pattern 2-38
FIG. 35
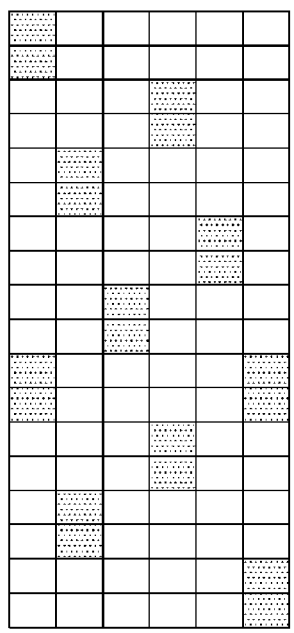
Pattern 2-39
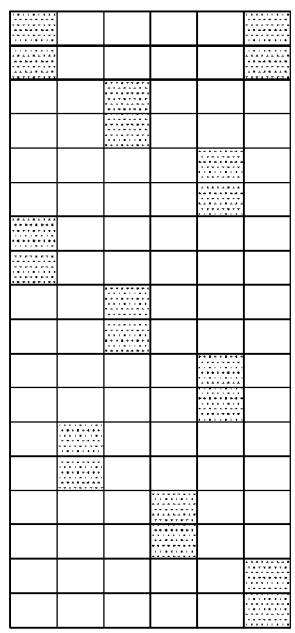
Pattern 2-40
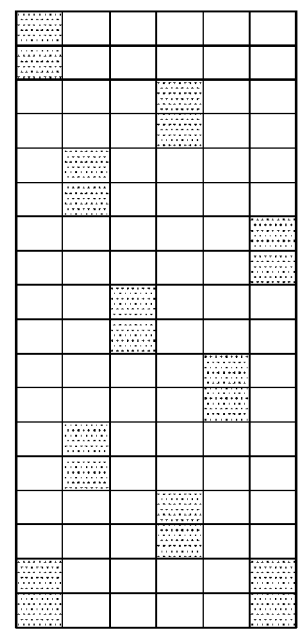
Pattern 2-41

FIG. 36
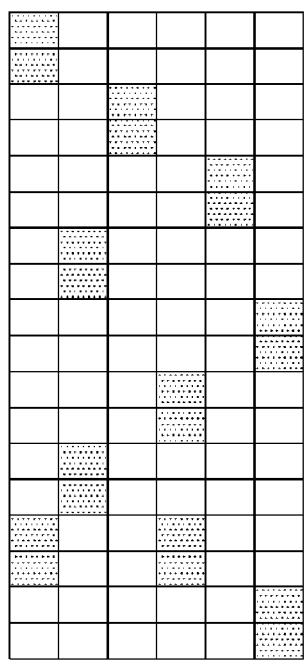
Pattern 2-42
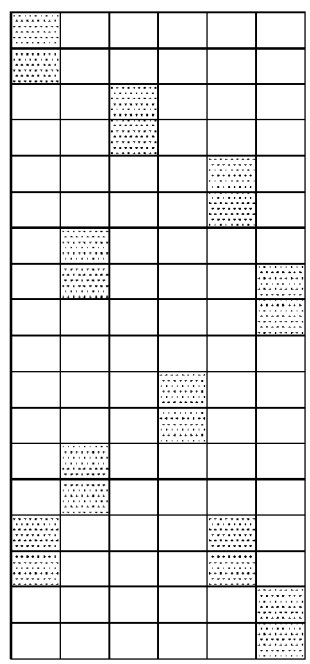
Pattern 2-43
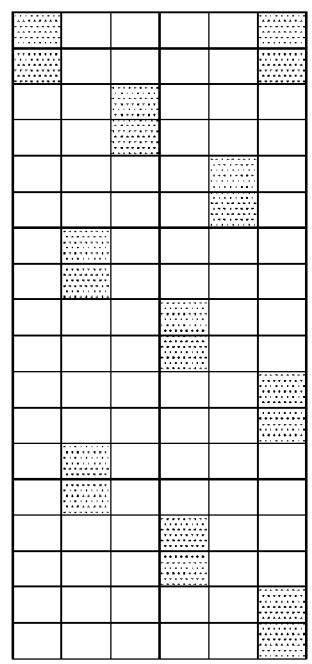
Pattern 2-44
FIG. 37
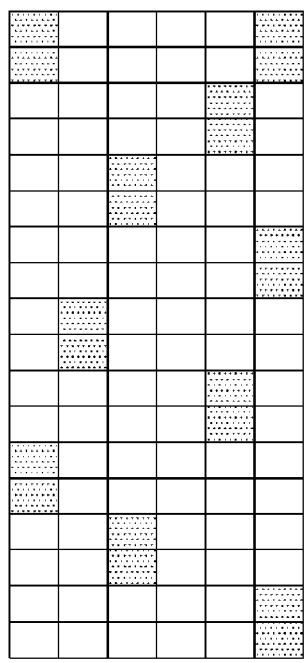
Pattern 2-45
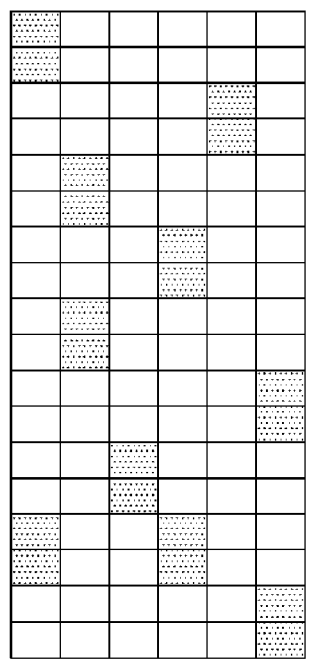
Pattern 2-46
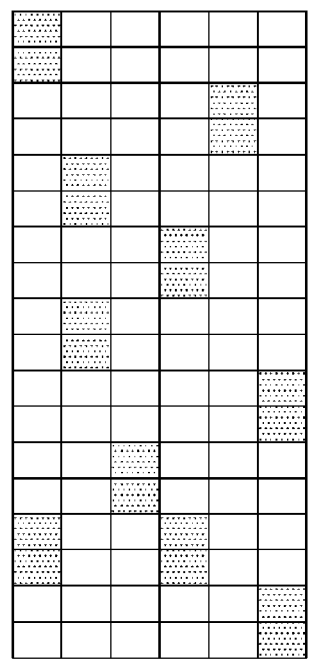
Pattern 2-47

FIG. 38
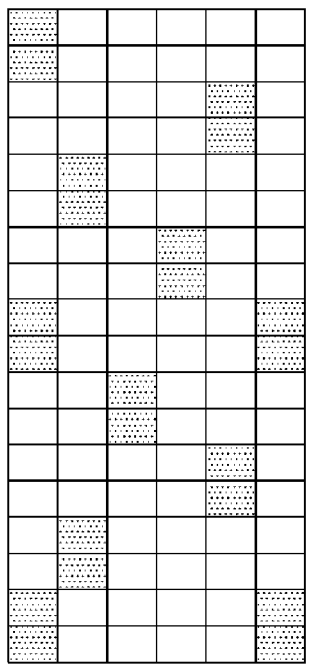
Pattern 3-1
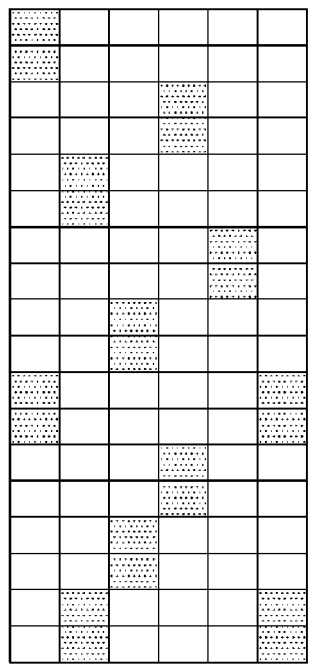
Pattern 3-2
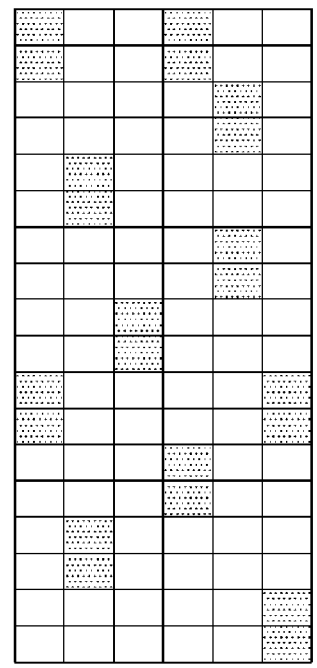
Pattern 3-3
FIG. 39
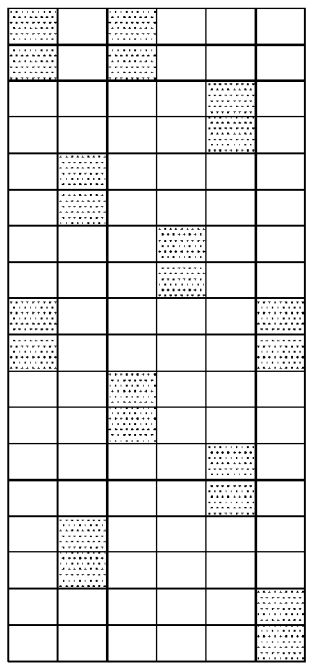
Pattern 3-4
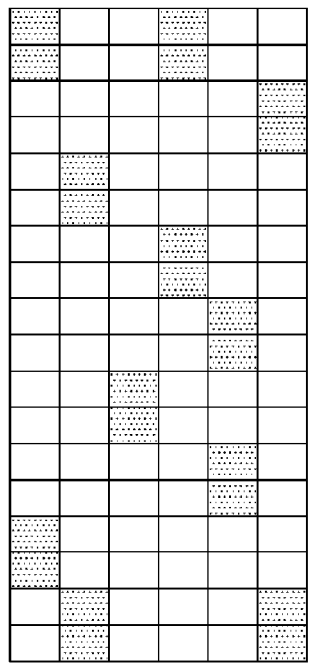
Pattern 3-5
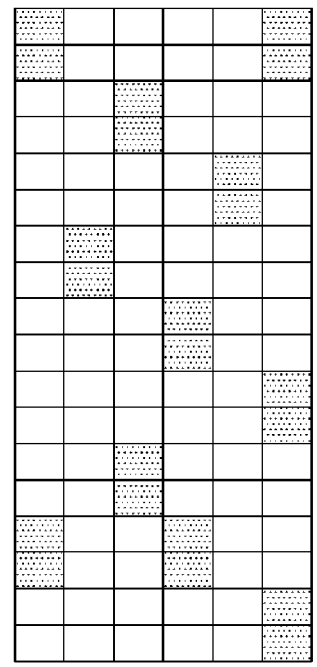
Pattern 3-6

FIG. 40
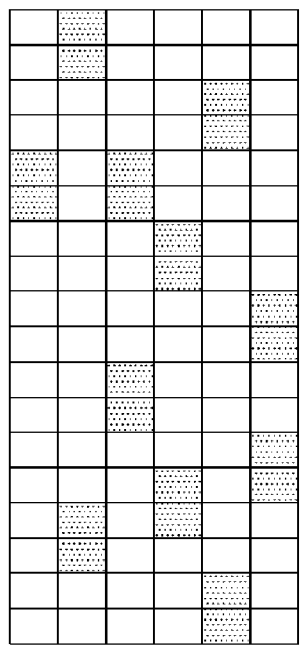
Pattern 3-7
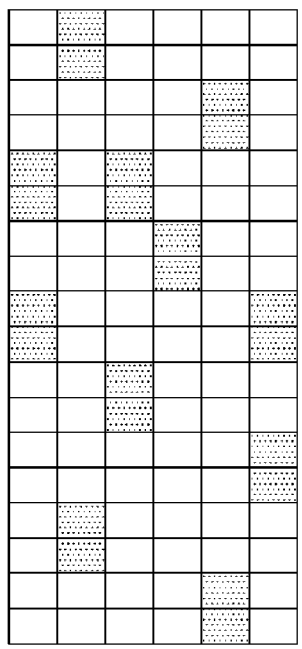
Pattern 3-8
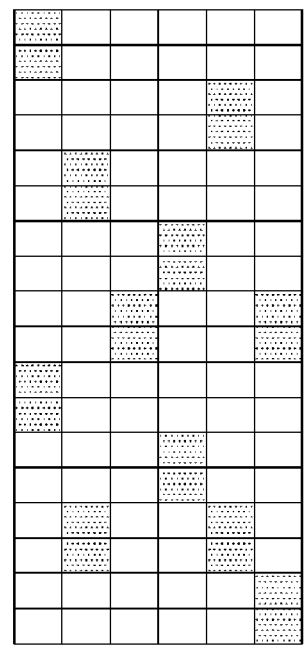
Pattern 3-9
FIG. 41
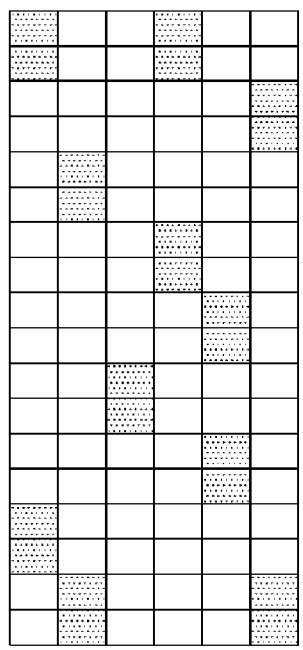
Pattern 3-10
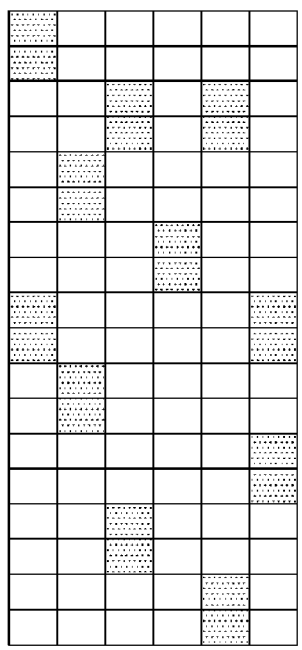
Pattern 3-11
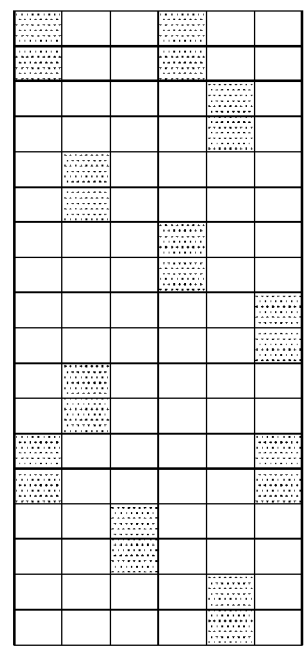
Pattern 3-12

FIG. 42
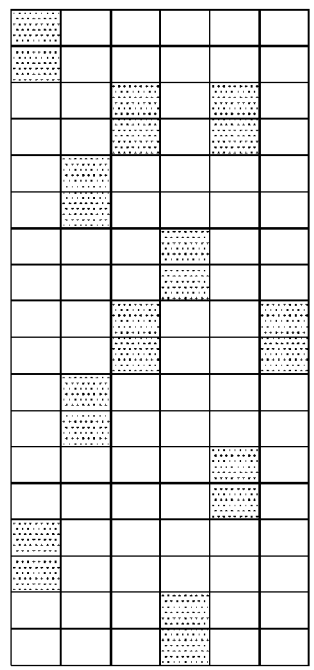
Pattern 3-13
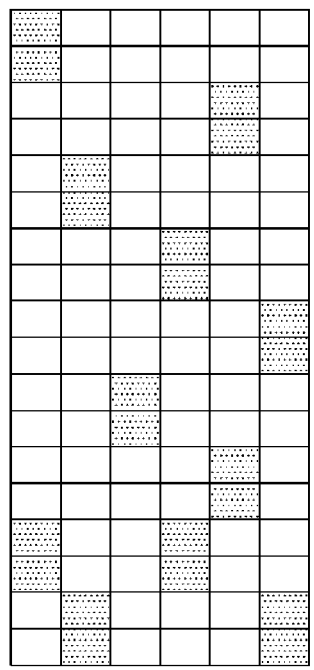
Pattern 3-14
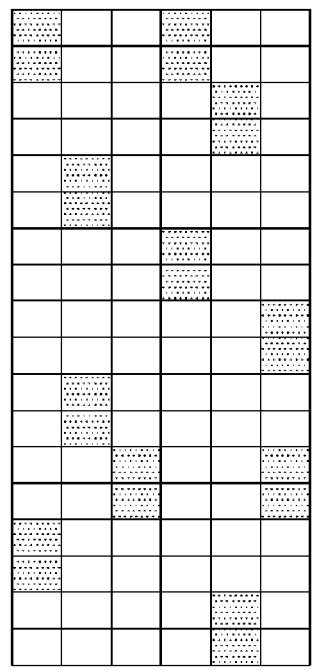
Pattern 3-15
FIG. 43
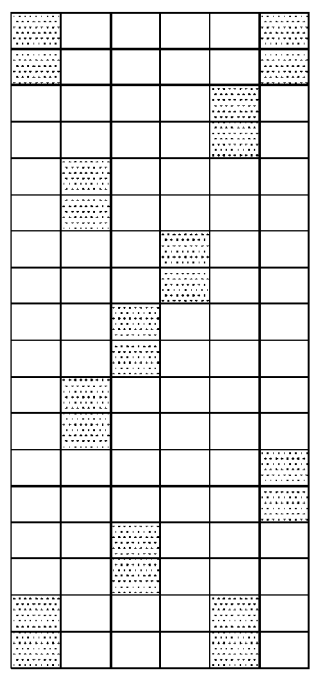
Pattern 3-16
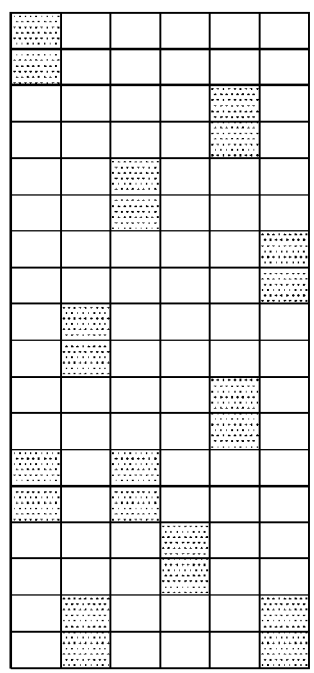
Pattern 3-17
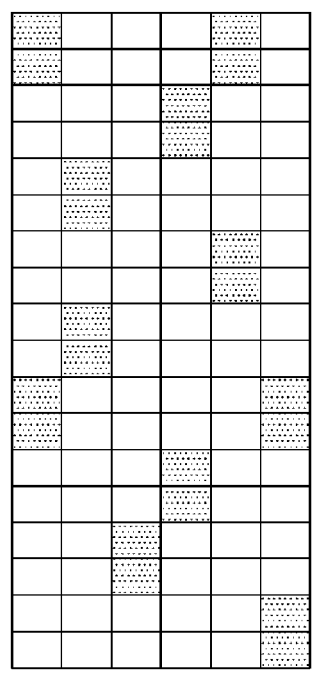
Pattern 3-18

FIG. 44
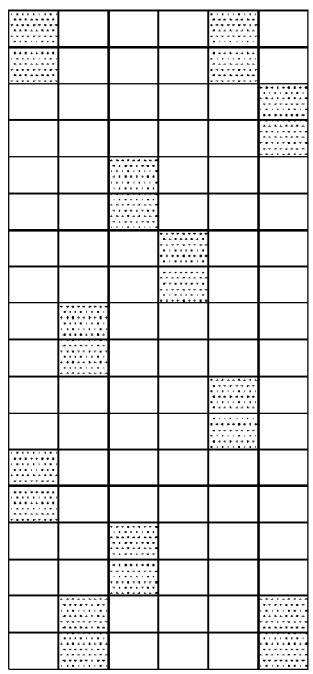
Pattern 3-19
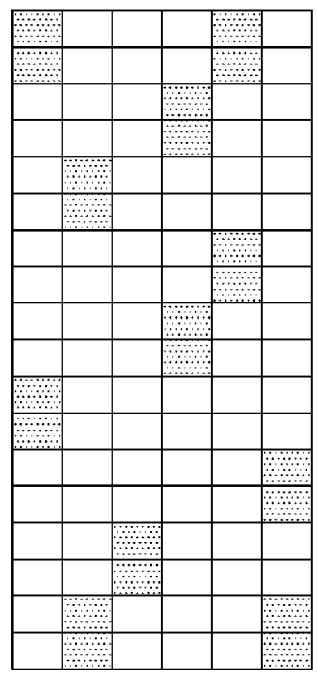
Pattern 3-20
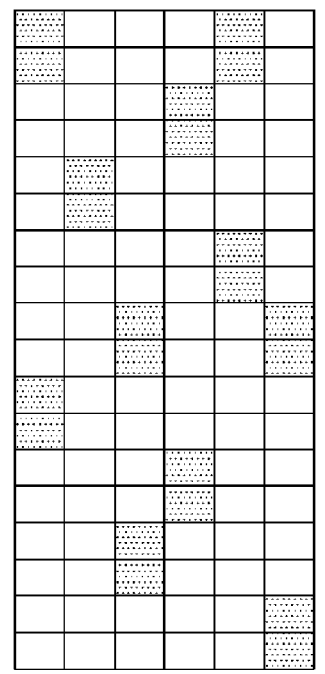
Pattern 3-21
FIG. 45
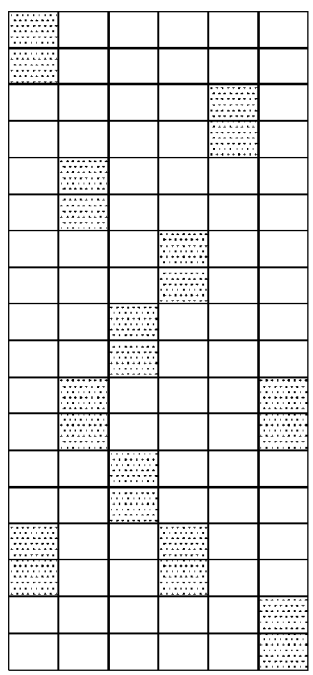
Pattern 3-22
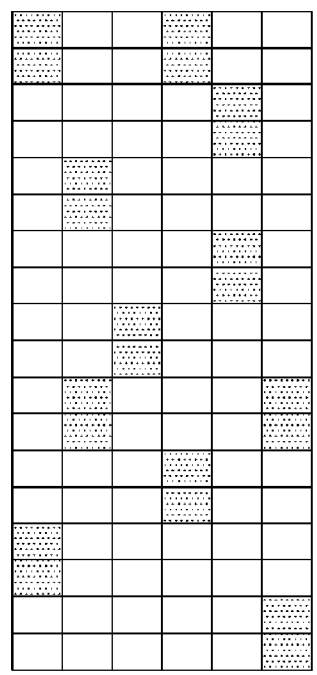
Pattern 3-23
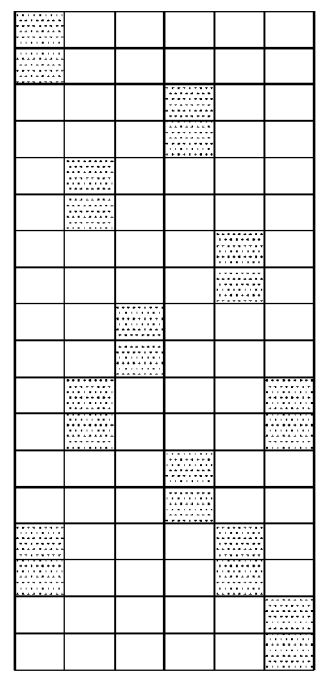
Pattern 3-24

FIG. 46
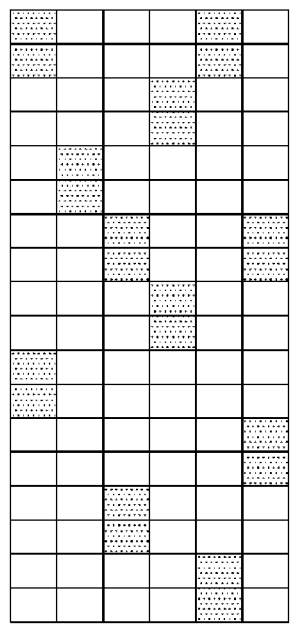
Pattern 3-25
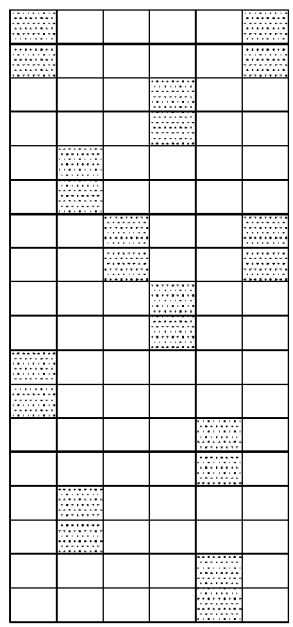
Pattern 3-26
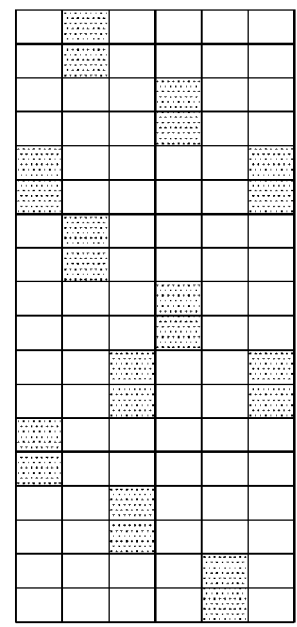
Pattern 3-27
FIG. 47
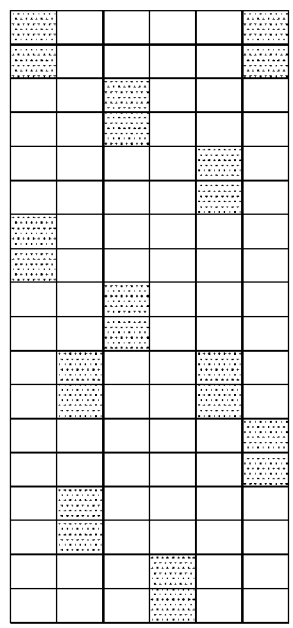
Pattern 3-28
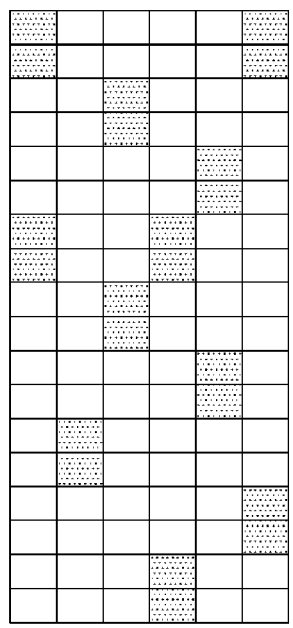
Pattern 3-29
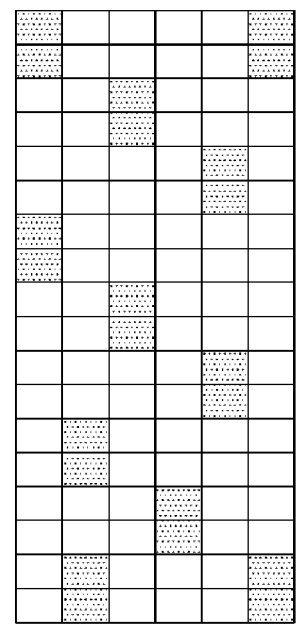
Pattern 3-30

FIG. 48
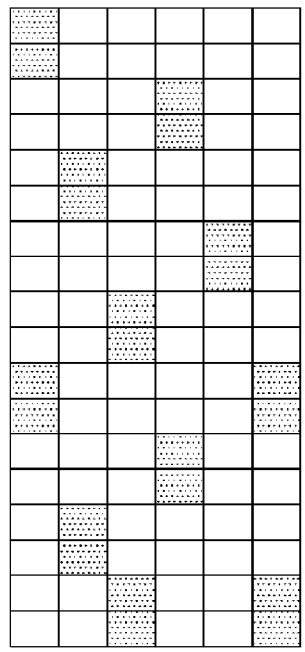
Pattern 3-31
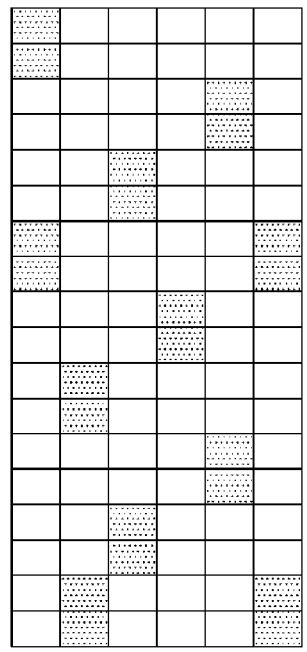
Pattern 3-32
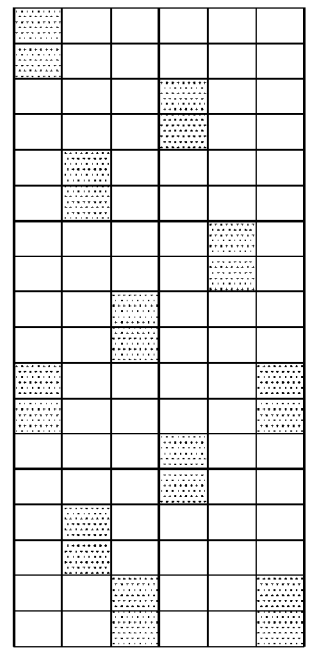
Pattern 3-33
FIG. 49
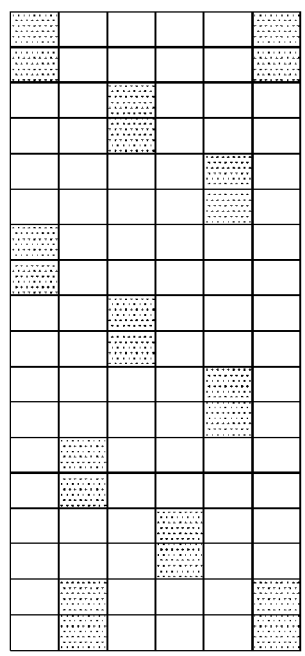
Pattern 3-34
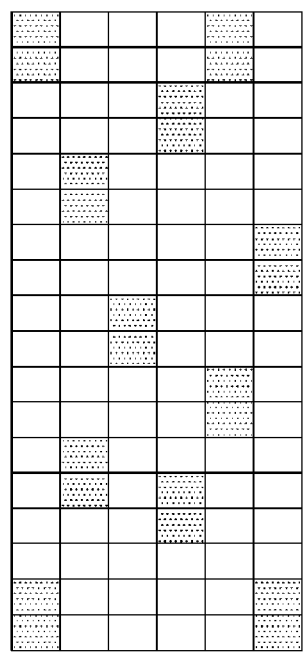
Pattern 3-35
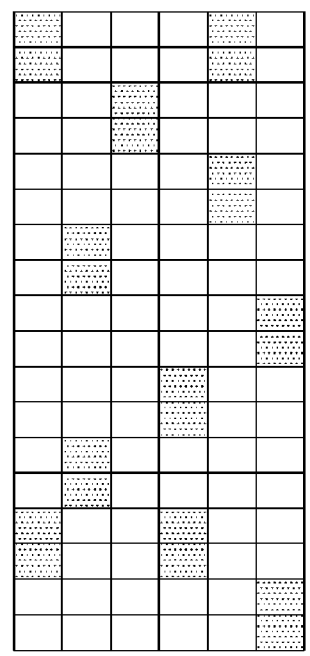
Pattern 3-36

FIG. 50
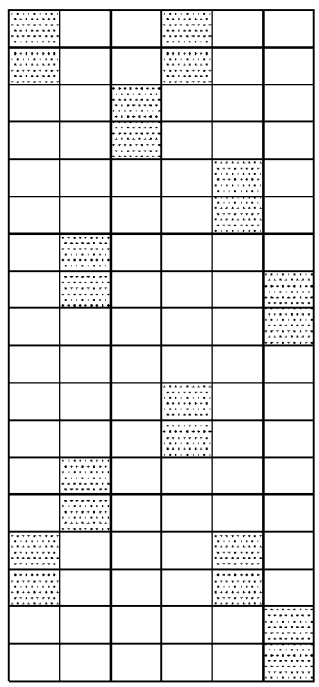
Pattern 3-37
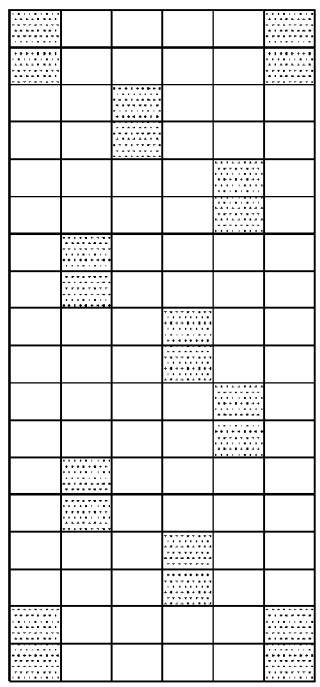
Pattern 3-38
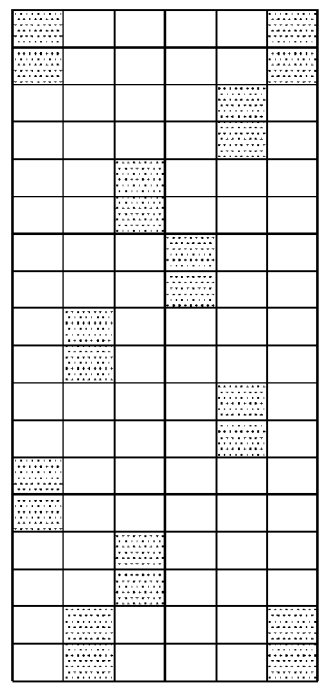
Pattern 3-39
FIG. 51
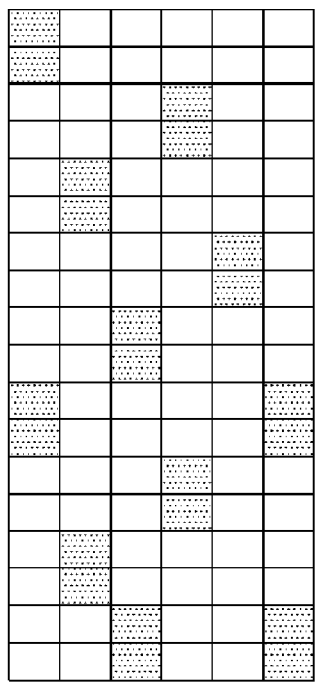
Pattern 3-40
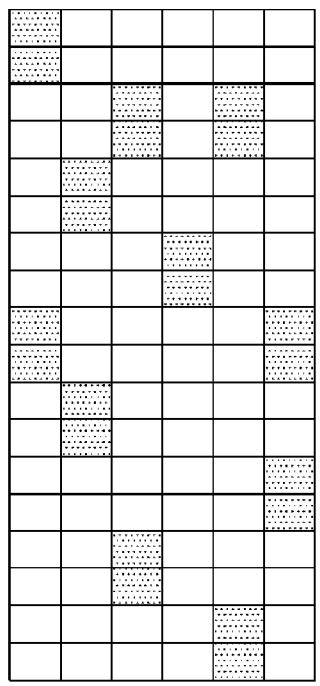
Pattern 3-41
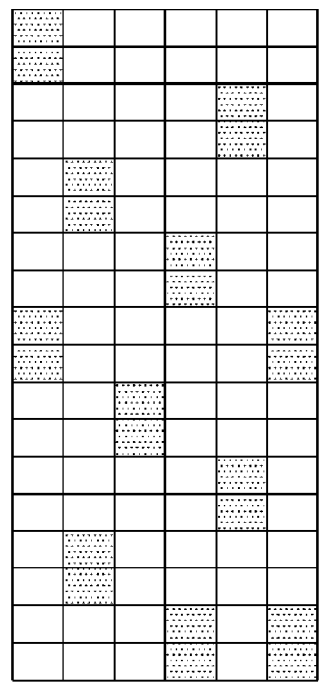
Pattern 3-42

FIG. 52
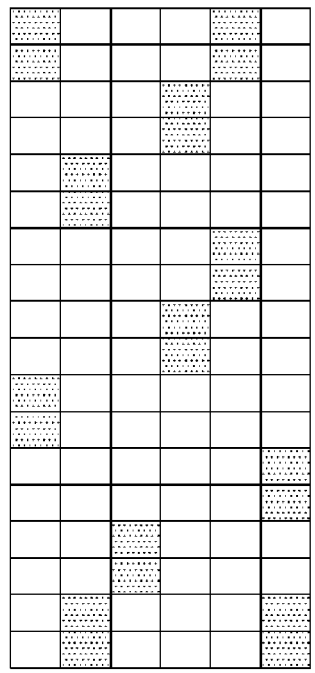
Pattern 3-43
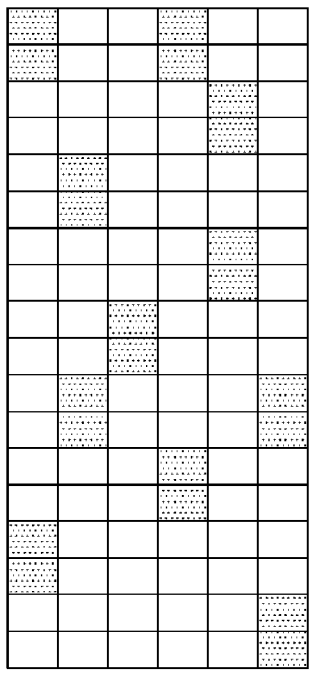
Pattern 3-44
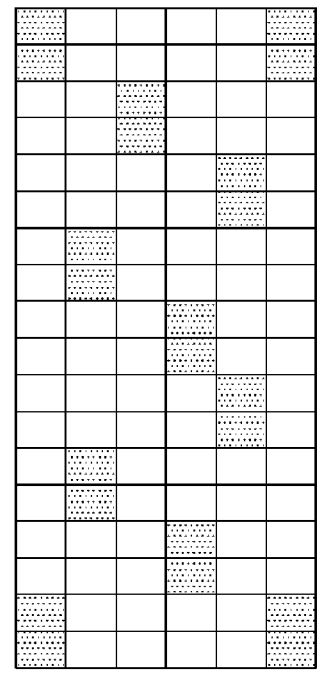
Pattern 3-45
FIG. 53
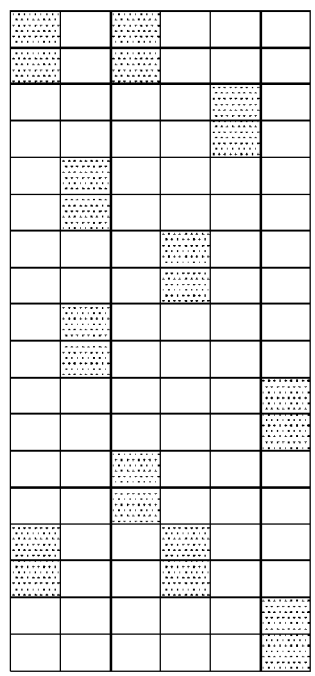
Pattern 3-46
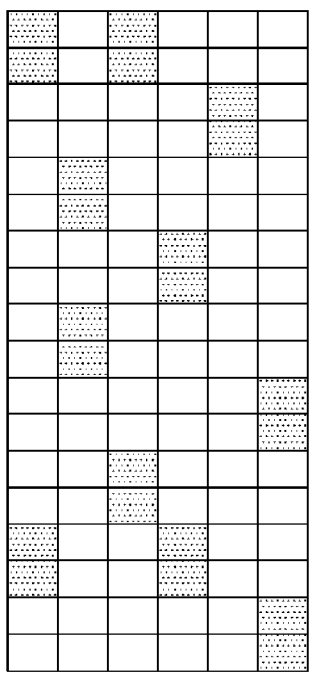
Pattern 3-47

FIG. 54

Pattern 4-1   Pattern 4-2   Pattern 4-3

FIG. 55

Pattern 4-4   Pattern 4-5

FIG. 56

Pattern 4-6    Pattern 4-7    Pattern 4-8

FIG. 57

Pattern 4-9    Pattern 4-10    Pattern 4-11

FIG. 58
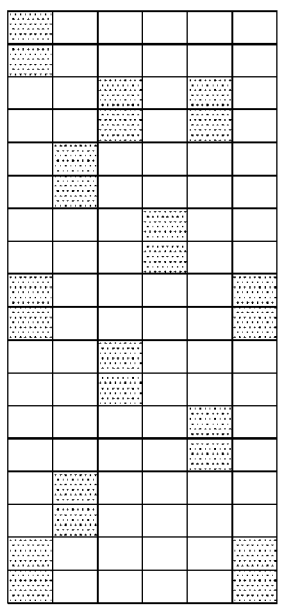
Pattern 4-12
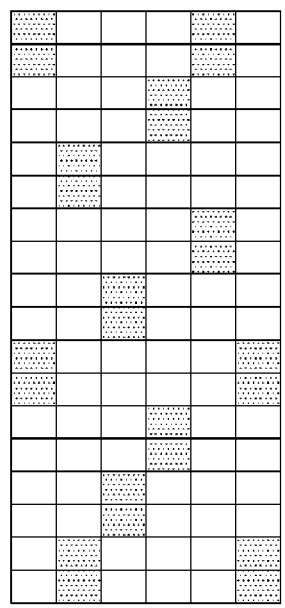
Pattern 4-13
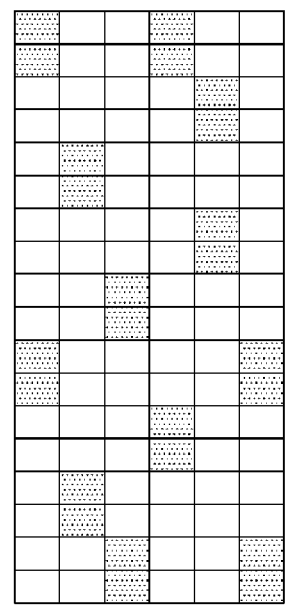
Pattern 4-14
FIG. 59
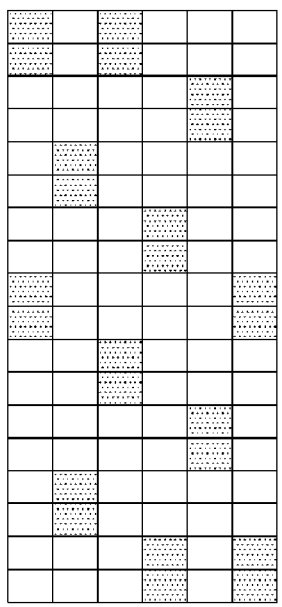
Pattern 4-15
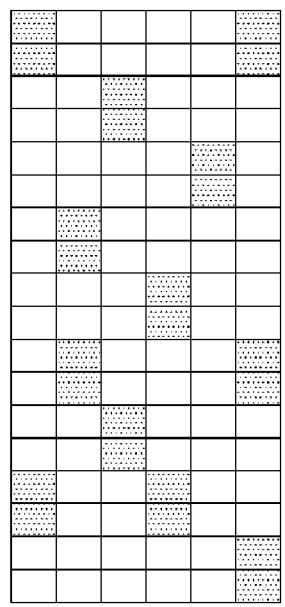
Pattern 4-16
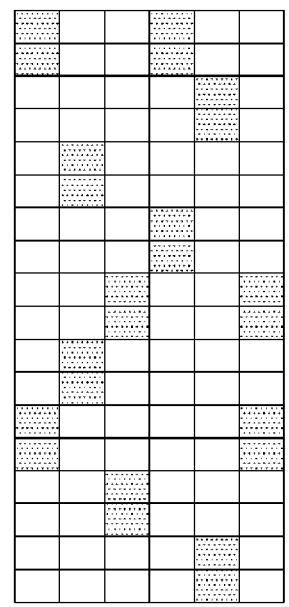
Pattern 4-17

FIG. 60
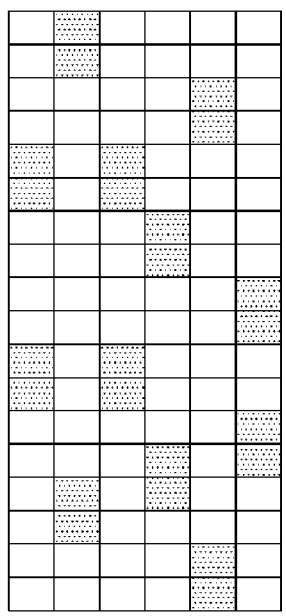
Pattern 4-18
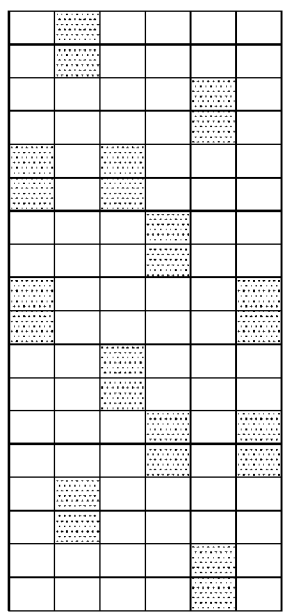
Pattern 4-19
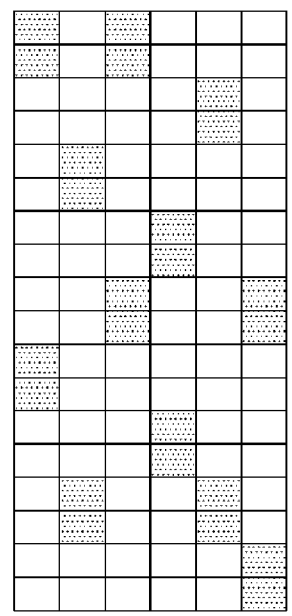
Pattern 4-20
FIG. 61
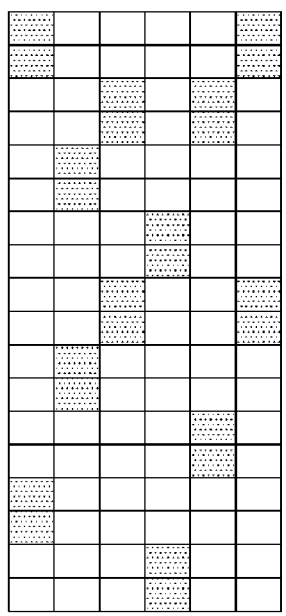
Pattern 4-21
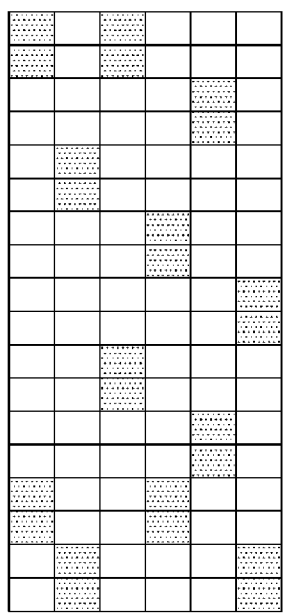
Pattern 4-22
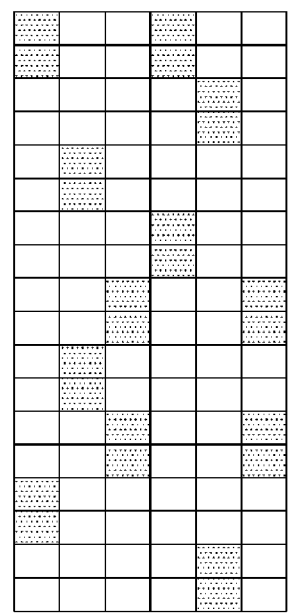
Pattern 4-23

FIG. 62
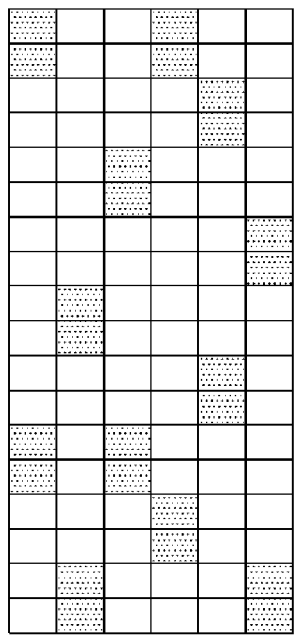
Pattern 4-24
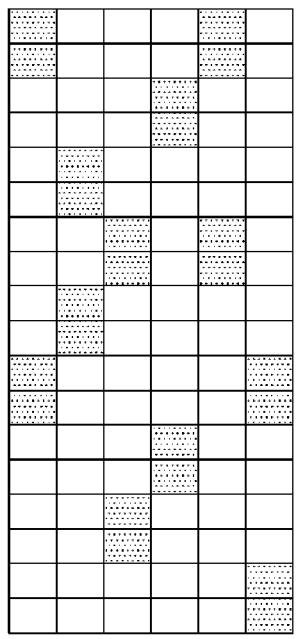
Pattern 4-25
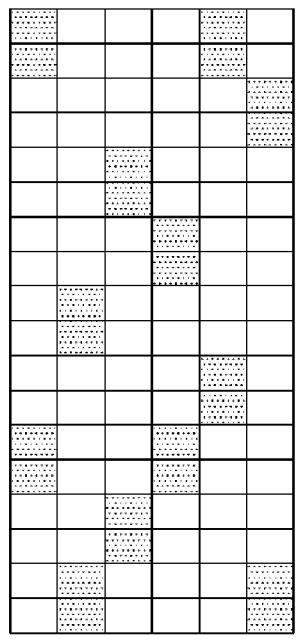
Pattern 4-26
FIG. 63
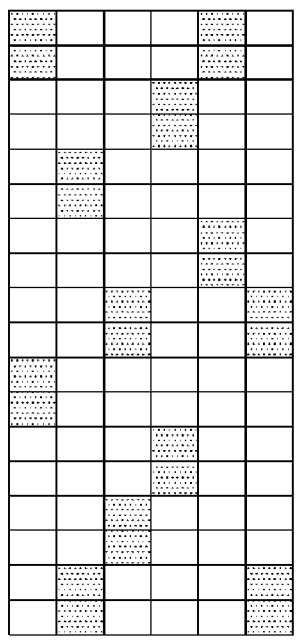
Pattern 4-27
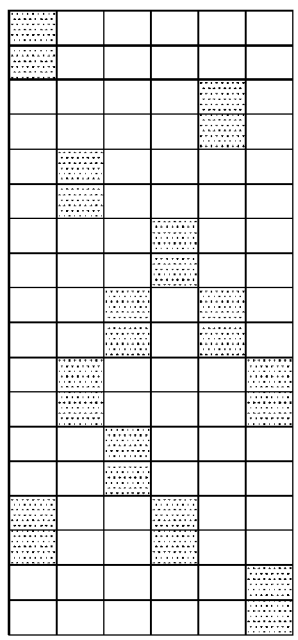
Pattern 4-28
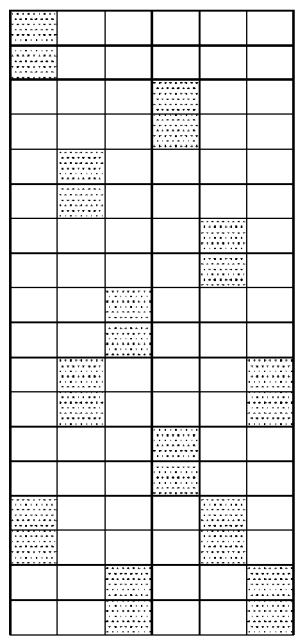
Pattern 4-29

FIG. 64
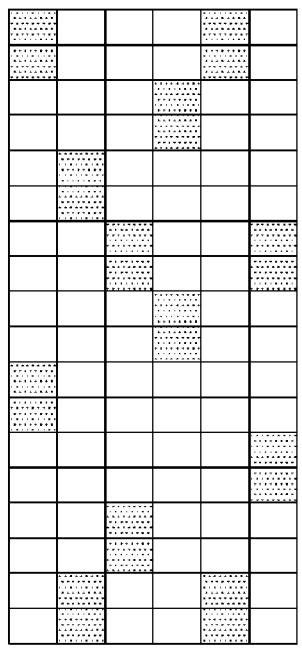
Pattern 4-30
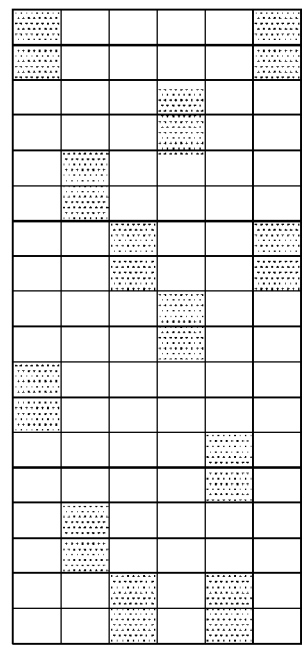
Pattern 4-31
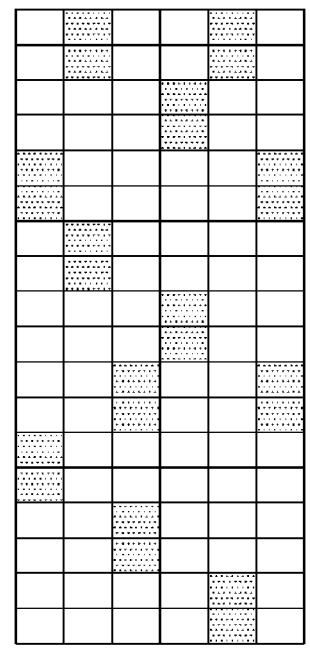
Pattern 4-32
FIG. 65
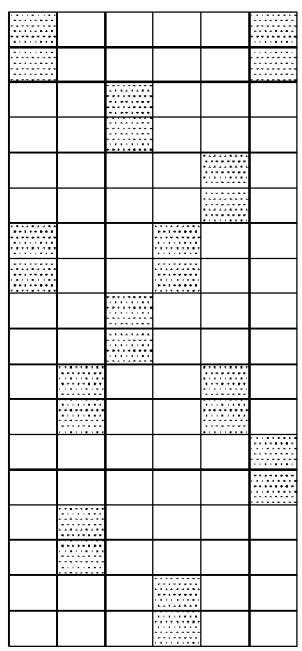
Pattern 4-33
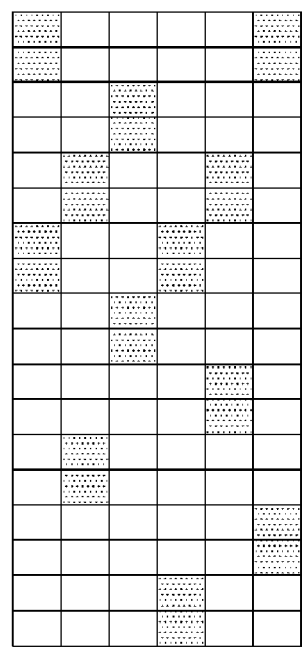
Pattern 4-34
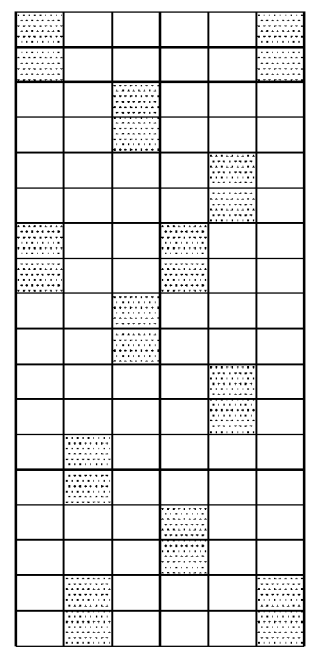
Pattern 4-35

FIG. 66
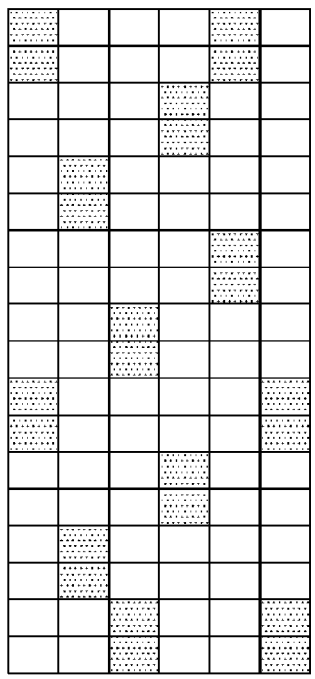
Pattern 4-36
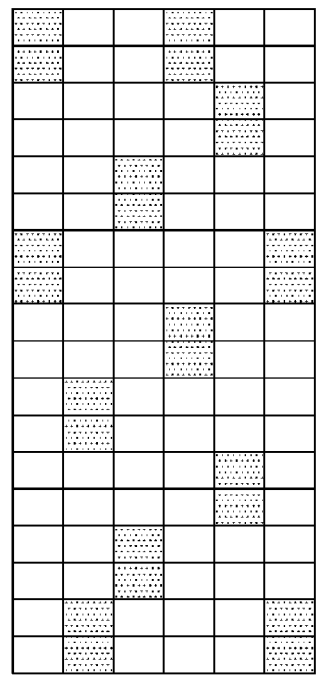
Pattern 4-37
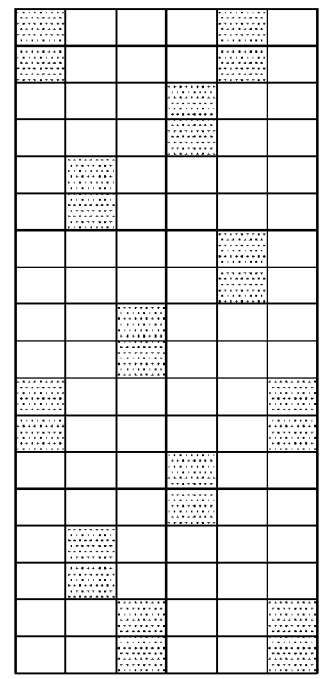
Pattern 4-38
FIG. 67
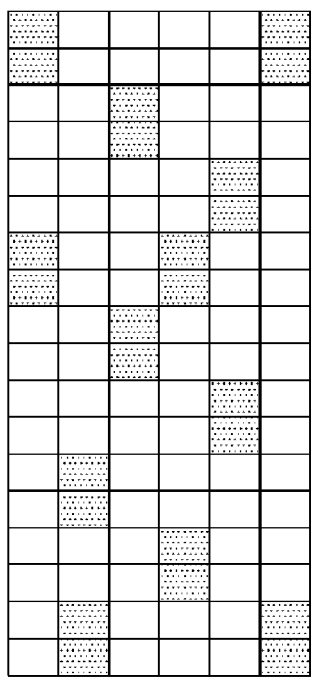
Pattern 4-39
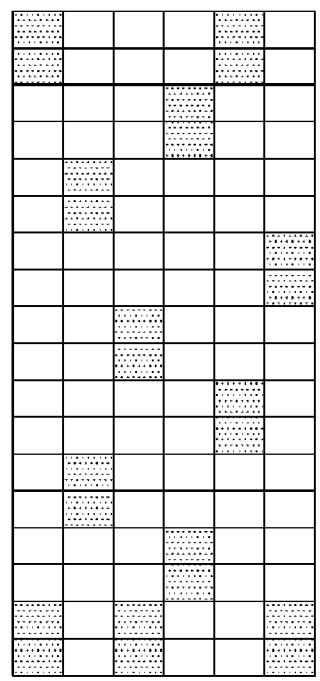
Pattern 4-40
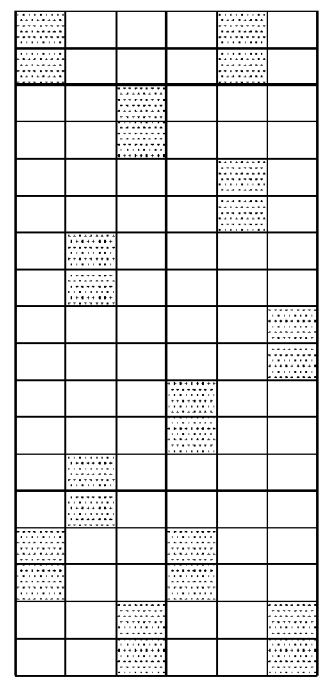
Pattern 4-41

Pattern 4-42　　　　　Pattern 4-43　　　　　Pattern 4-44

METHOD AND APPARATUS FOR TRANSMITTING PILOT IN A WIRELESS COMMUNICATION SYSTEM

This application claims the benefit of U.S. provisional applications 61/142,642, 61/152,258, 61/241,031 and 61/254,752 respectively filed on Jan. 6, 2009, Feb. 13, 2009, Sep. 10, 2009 and Oct. 26, 2009, which are hereby incorporated by reference as if fully set forth herein.

BACKGROUND OF THE INVENTION

1. Field of the Invention

The present invention relates to a wireless communication system, and more particularly, to an apparatus for transmitting a pilot and method thereof.

2. Discussion of the Related Art

Recently, wireless communication systems are ongoing to be widely and globally developed to provide various kinds of communication services for speech, data and/or the like. Generally, a wireless communication system is a multiple access system capable of supporting multi-user communications by sharing available system resources (e.g., bandwidth, transmission power, etc.). For example, the multiple access system includes CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

SUMMARY OF THE INVENTION

Accordingly, the present invention is directed to an apparatus for transmitting a pilot and method thereof that substantially obviate one or more problems due to limitations and disadvantages of the related art.

An object of the present invention is to provide an apparatus for transmitting a pilot and method thereof, by which a pilot can be efficiently transmitted in a wireless communication system.

Another object of the present invention is to provide an apparatus for transmitting a pilot and method thereof, by which a pilot can be efficiently transmitted in a radio channel having large frequency selectivity.

A further object of the present invention is to provide a pilot structure, by which multicast/broadcast can be efficiently supported, preferably in case of a large inter-cell gap.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a resource unit in downlink, in which the resource unit is transmitted by a base station in a wireless communication system, according to the present invention includes the steps of forming the resource unit including a plurality of pilot resource elements (REs) and a plurality of data resource elements, allocating a plurality of pilot pairs to have a prescribed subcarrier interval and a prescribed OFDM (orthogonal frequency division multiplexing) symbol interval within the resource unit, and transmitting the resource unit to a user equipment via multi-antenna, wherein each of a plurality of the pilot pairs includes individual pilots for two different streams or antennas.

In another aspect of the present invention, a base station in a wireless communication system includes an RF (radio frequency) unit configured to transmit a radio signal to a user equipment and a processor configured to control the RF unit by being connected to the RF unit, the processor configured to perform a method of transmitting a resource unit in downlink, the method including the steps of forming the resource unit including a plurality of pilot resource elements (REs) and a plurality of data resource elements, allocating a plurality of pilot pairs to have a prescribed subcarrier interval and a prescribed OFDM (orthogonal frequency division multiplexing) symbol interval within the resource unit, and transmitting the resource unit to a user equipment via multi-antenna, wherein each of a plurality of the pilot pairs includes individual pilots for two different streams or antennas.

Preferably, the method further includes the step of allocating data to location to which the plurality of pilot pairs are not allocated within the resource unit. In this case, the data is permutated by a subcarrier pair unit within each OFDM symbol.

Preferably, the resource unit includes 18 subcarriers×3 OFDM symbols, 18 subcarriers×6 OFDM symbols, 36 subcarriers×3 OFDM symbols and 36 subcarriers×6 OFDM symbols.

Preferably, 4 resource units are adjacent to each other on a frequency axis to construct one basic band and a plurality of basic bands are spaced apart from each other on the frequency axis.

Preferably, the resource unit is used for multicast/broadcast service.

Preferably, each of a plurality of the pilot pairs is allocated to two frequency resources adjacent to each other within one OFDM symbol.

Preferably, an interval among a plurality of the pilot pairs is set to 4 subcarriers or below in a frequency domain.

Preferably, positions of the individual pilots within each pilot pair are determined independently.

More preferably, positions of the individual pilots within each pilot pair are switched by a unit of a prescribed number of OFDM symbols in a time domain.

For instance, positions of the individual pilots within each of a plurality of the pilot pairs are switched by a unit of half-subframe unit (e.g., 3 OFDM symbols) in a time domain. Moreover, positions of the individual pilots within each pilot pair are switched by a unit of a prescribed number of subcarriers in a frequency domain. For example, positions of the individual pilots within each pilot pair are switched by a unit of half of the resource unit (e.g., 9 subcarriers) in a frequency domain.

Preferably, locations to which the plurality of the pilot pairs is allocated are cyclically shifted in a frequency or time domain.

Preferably, power of each pilot pair is boosted using power of data within a same OFDM symbol.

Preferably, locations to which the plurality of the pilot pairs are allocated are set equal among a plurality of cells providing the same multicast/broadcast service.

Preferably, a sequence constructing each of the individual pilots is set equal among a plurality of cells providing the same multicast/broadcast service. In this case, the pilot can include one of a PN (Pseudo Noise) sequence, CAZAC (Constant Amplitude Zero AutoCorrelation) sequence, ZC (Zadoff-Chu) sequence, a computer generative sequence having a good correlation characteristic and the like.

Preferably, locations of the plurality of the pilot pairs within the resource unit are represented as a following pattern table:

| Pattern table | | | | | | |
|---|---|---|---|---|---|---|
| | os = 0 | os = 1 | os = 2 | os = 3 | os = 4 | os = 5 |
| sp = 0 | PP | * | * | PP | * | * |
| sp = 1 | * | * | * | * | * | * |
| sp = 2 | * | PP | * | * | PP | * |
| sp = 3 | * | * | * | * | * | * |
| sp = 4 | * | * | PP | * | * | PP |
| sp = 5 | * | * | * | * | * | * |
| sp = 6 | PP | * | * | PP | * | * |
| sp = 7 | * | * | * | * | * | * |
| sp = 8 | * | PP | * | * | PP | * |

In this case, the sp indicates a subcarrier pair index, the os indicates an OFDM symbol index, the PP indicates the pilot pair including the individual pilots for the two different streams or antennas, the * indicates an allocated location of data, locations of the individual pilots within the PP can be independently switched to each other, and the PP can be cyclically shifted along a time or frequency axis.

Accordingly, the present invention provides the following effects and/or advantages.

First of all, the present invention is able to efficiently transmit pilots in a wireless communication system. In particular, the present invention is able to efficiently transmit pilots in a channel configuration having high frequency selectivity.

Secondly, the present invention provides a pilot structure capable of supporting multicast/broadcast efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 21 are diagrams for example of allocating a pilot pair into a resource unit to set an overhead to 8.33% according to one embodiment of the present invention;

FIGS. 22 to 37 are diagrams for example of allocating a pilot pair into a resource unit to set an overhead to 9.25% according to one embodiment of the present invention;

FIGS. 38 to 53 are diagrams for example of allocating a pilot pair into a resource unit to set an overhead to 10.1% according to one embodiment of the present invention;

FIGS. 54 to 68 are diagrams for example of allocating a pilot pair into a resource unit to set an overhead to 11.1% according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention are usable for various wireless access technologies including CDMA, FDMA, TFMA, OFDMA, SC-FDMA, MC-FDMA and the like. CDMA can be implemented by such a wireless technology as UTRA (universal terrestrial radio access), CDMA 2000 and the like. TDMA can be implemented with such a wireless technology as GSM/GPRS/EDGE (Global System for Mobile communications)/General Packet Radio Service/Enhanced Data Rates for GSM Evolution). OFDMA can be implemented with such a wireless technology as IEEE 802.11 (Wi-Fi), IEEE 802.16 (WiMAX), IEEE 802.20, E-UTRA (Evolved UTRA), etc. UTRA is part of UMTS (Universal Mobile Telecommunications System). 3GPP (3rd Generation Partnership Project) LTE (long term evolution) is a part of E-UMTS (Evolved UMTS) that uses E-UTRA. LTE-A (LTE-Advanced) is an evolved version of 3GPP LTE.

The following descriptions are made for the case of applying the technical features of the present invention to a wireless communication system. Although the following embodiments are described centering on a base station (e.g., a transmitter), the present invention is symmetrically applicable to a user equipment (e.g., a receiver) as well.

Figure 1:
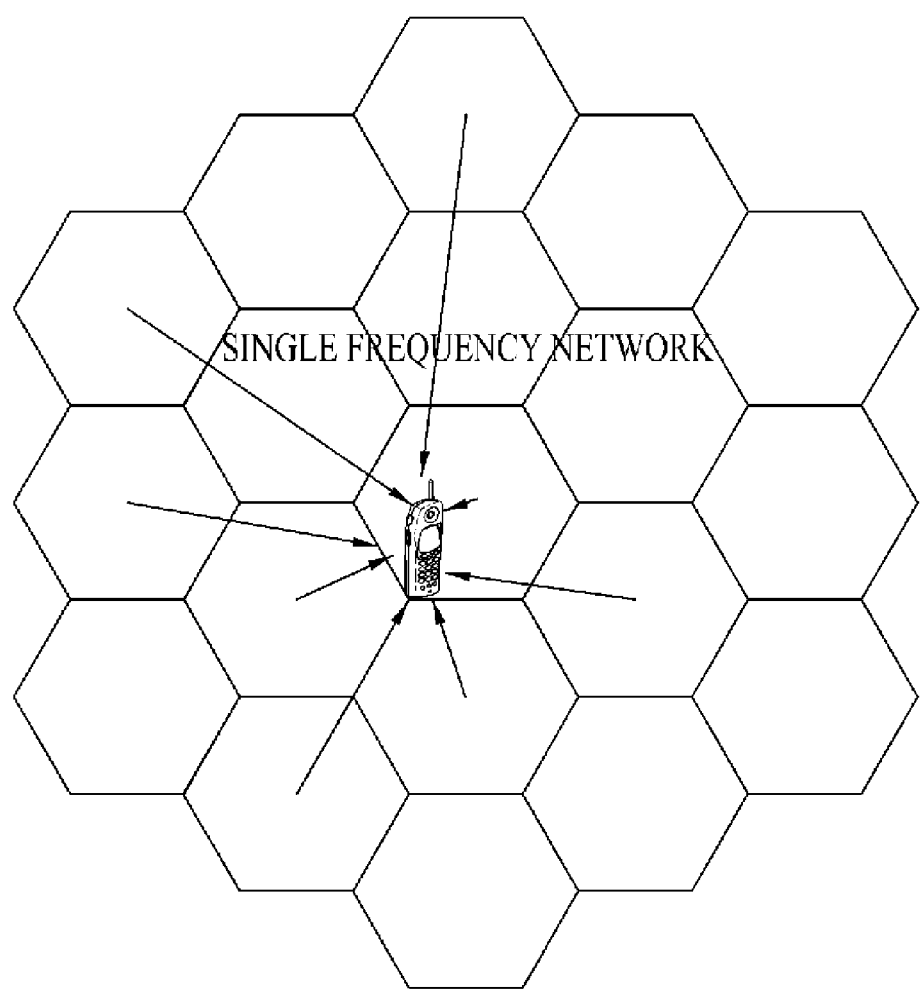
FIG. 1 is a conceptional diagram for providing a multicast/broadcast service using macro diversity.

FIG. 1 is a conceptional diagram for providing a multicast/broadcast service using macro diversity.

Referring to FIG. 1, a macro diversity operation mode can be called a multicast broadcast single frequency network (hereinafter abbreviated MBSFN). In particular, FIG. 1 exemplarily shows an MBS (multicast and broadcast service) zone to which SFN is applied. The MBS can be called an E-MBS (enhanced MBS) or an MBMS (multimedia broadcast and multicast service). The MBS zone can be synchronized at a symbol level for securing macro diversity of combining signals from a multi-cell and high cell boundary performance. Therefore, the same multicast/broadcast data provided by cells joining the SFN are synchronized with each other. Particularly, an SFN operation can be performed in a manner that a plurality of cells having timing error within a range of a cyclic prefix (CP) transmit the same data at the same time using the same transmission mechanism (e.g., symbol, subchannel, same frame number, modulation scheme, etc.).

Figure 2:
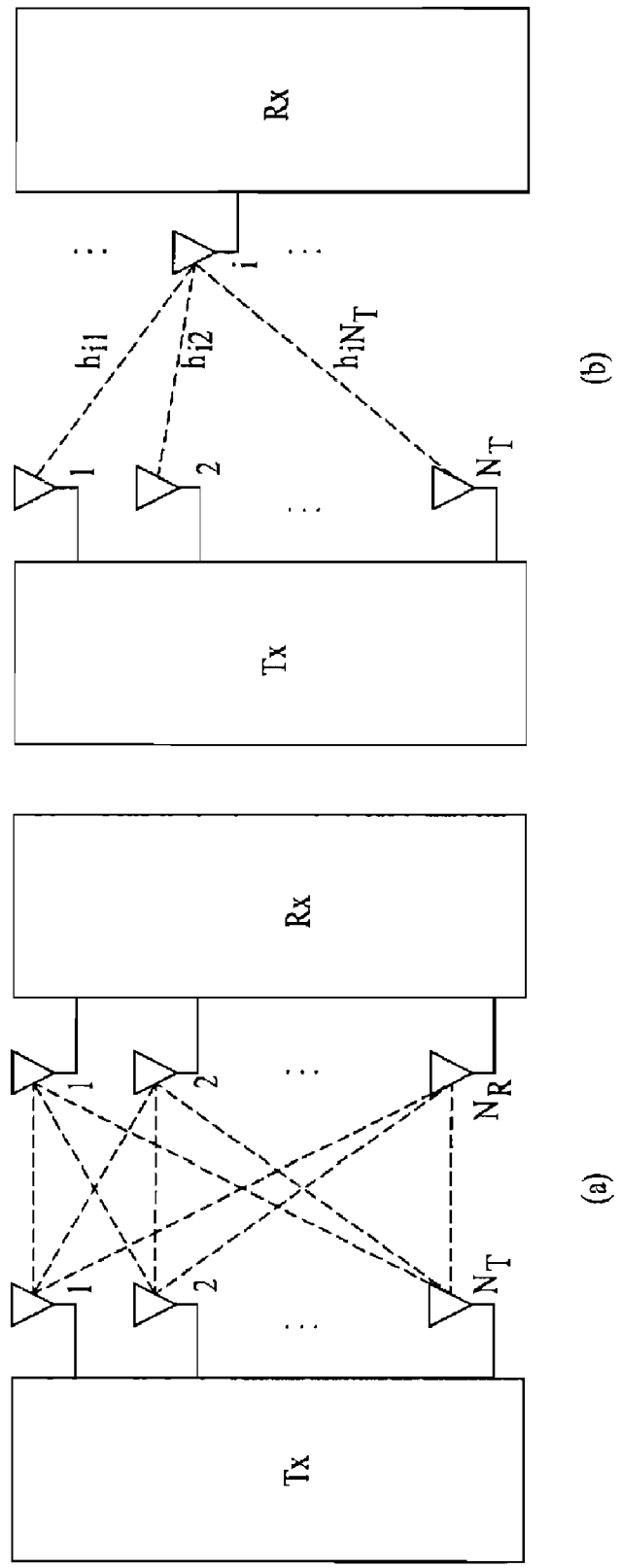
FIG. 2 is a diagram for an antenna configuration of MIMO system.

FIG. 2 (a) and FIG. 2 (b) are diagrams for a configuration of a wireless communication system having multi-antenna. In this case, assume that $N_T$ transmitting antennas and $N_R$ receiving antennas exist in a wireless communication system.

A communicating method in an MIMO system is explained in detail with reference to FIG. 2 (a) using mathematical modeling. Looking into a transmission signal, if $N_T$ transmitting antennas exist, the maximum number of transmittable informations is $N_T$. The transmission information can be represented as follows.

$$S=[S_1, S_2, \ldots, S_{N_T}]^T \qquad \text{[Formula 1]}$$

Transmission informations $S_1, S_2, \ldots, S_{N_T}$ may differ from each other in transmission power. If transmission powers are set to $P_1, P_2, \ldots, P_{N_T}$, respectively, transmission power adjusted transmission information can be represented as follows.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Formula 2]}$$

And, $\hat{S}$ can be represented as the following formula using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 3]}$$

Let's consider a case that $N_T$ transmission signals $x_1, x_2, \ldots, x_{N_T}$, which are actually transmitted, are configured by applying a weight matrix W to the transmission power adjusted information vector $\hat{S}$. The weight matrix W plays a role in appropriately distributing the transmission information to each antenna according to a transmission channel status and the like. The $x_1, x_2, \ldots, x_{N_T}$ can be represented as the following formula using a vector X.

$$x = \begin{bmatrix} x_1 \\ x_2 \\ \vdots \\ x_i \\ \vdots \\ x_{N_T} \end{bmatrix} \quad \text{[Formula 4]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

In Formula 4, $W_{ij}$ means a weight value between an $i^{th}$ transmitting antenna and a $j^{th}$ information. And, W can be called a precoding matrix.

Regarding reception signals, if $N_R$ receiving antennas exist, reception signals $y_1, y_2, \ldots, y_{N_R}$ of the respective antennas can be represented as the following formula.

$$y=[y_1, y_2, \ldots, y_{N_R}]^T \quad \text{[Formula 5]}$$

In case that a channel is modeled in multi-antenna (MIMO) wireless communication system, a channel can be identified according to a transmitting/receiving antenna index. A channel from a transmitting antenna j to a receiving antenna i shall be represented as $h_{ij}$. Regarding an index sequence of the $h_{ij}$, it should be noted that an index of a receiving antenna is followed by an index of a transmitting antenna.

FIG. 2 (b) shows channels from $N_T$ transmitting antennas to a receiving antenna i. The channels are tied together to be represented as a vector and matrix form.

Referring to FIG. 2 (b), the channels arriving at the receiving antenna i from total $N_T$ transmitting antennas can be represented as the following formula.

$$h_i^T=[h_{i1}, h_{i2}, \ldots, h_{iN_T}] \quad \text{[Formula 6]}$$

Hence, all channels arriving at $N_R$ receiving antennas from $N_T$ transmitting antennas can be represented as the following formula.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Formula 7]}$$

In the channel matrix H, the number of rows is equal to the number $N_R$ of the receiving antennas and the number of columns is equal to the number $N_T$ of the transmitting antennas. Namely, the channel matrix H becomes $N_R \times N_T$ matrix.

Additive white Gaussian noise (AWGN) is added to a real channel through the channel matrix H. White gaussian noises $n_1, n_2, \ldots, n_{N_R}$ respectively added to $N_R$ receiving antennas can be represented as the following formula.

$$n=[n_1, n_2, \ldots, n_{N_R}]^T \quad \text{[Formula 8]}$$

Through the above-described formula modeling, a reception signal can be represented as the following formula.

$$y = \begin{bmatrix} y_1 \\ y_2 \\ \vdots \\ y_i \\ \vdots \\ y_{N_R} \end{bmatrix} \quad \text{[Formula 9]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Figure 3:
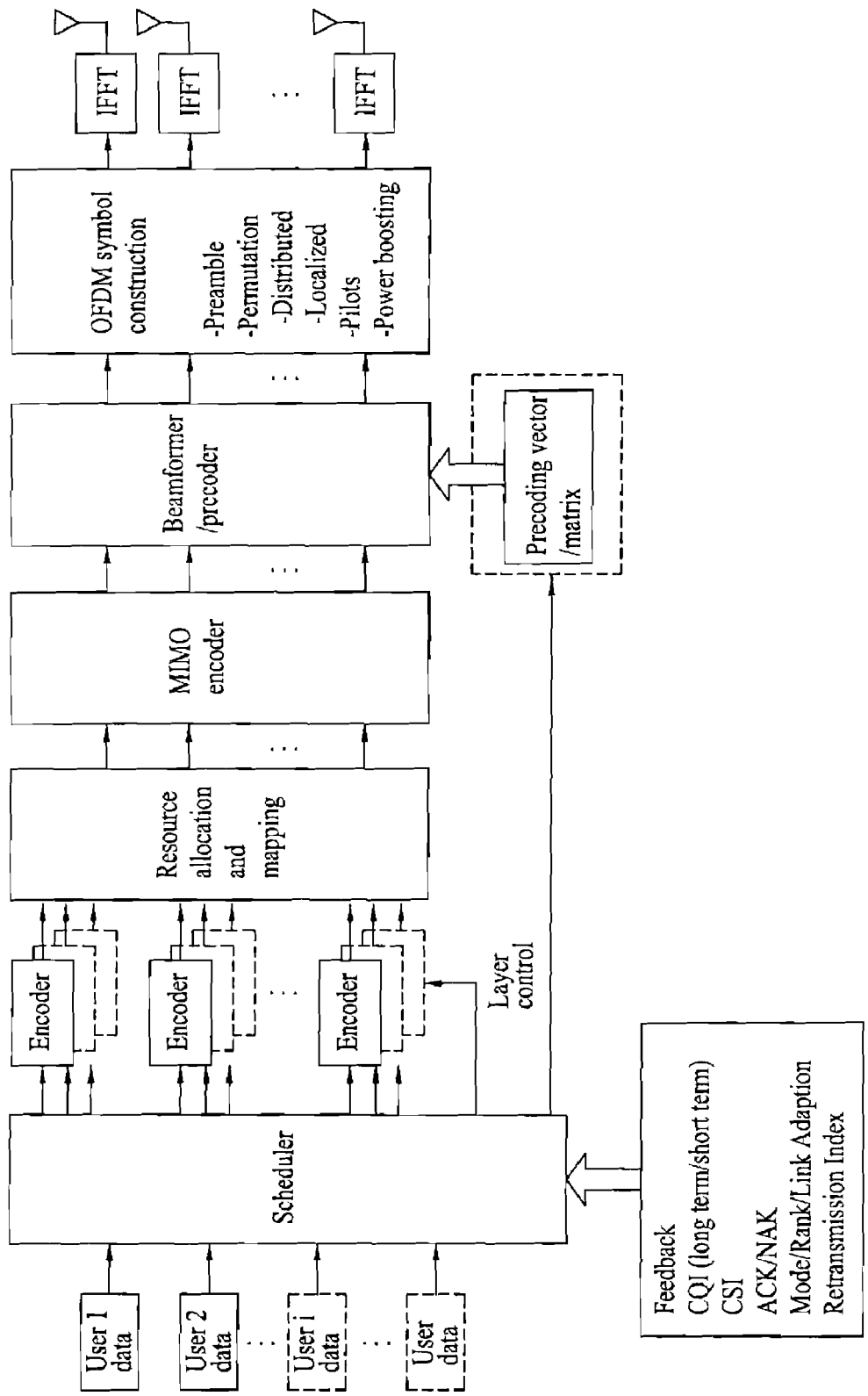
FIG. 3 is a block diagram of a system applicable to one embodiment of the present invention.
Figure 8:
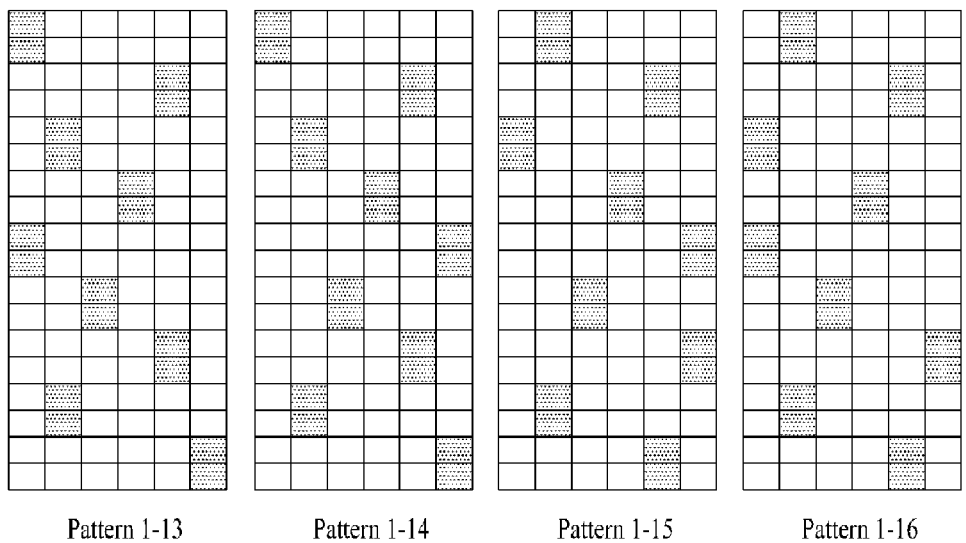
Figure 9:
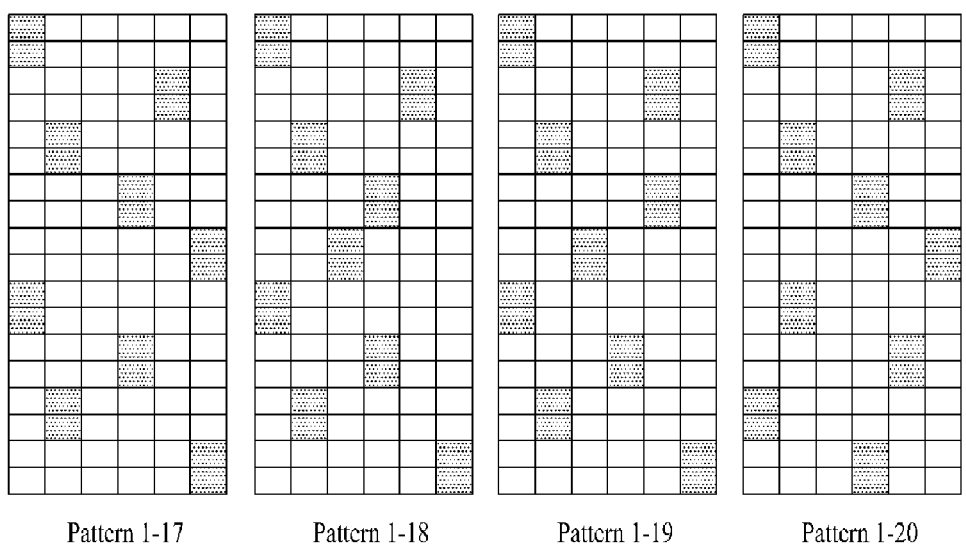

FIG. 3 is a block diagram of a system applicable to one embodiment of the present invention.

Referring to FIG. 3, a feedback block provides a scheduler block with such feedback information as CQI (Channel Quality Information), CSI (Channel Status Information) and the like. In consideration of the feedback information and the like, the scheduler block schedules data (user data) to transmit to a user and determines MCS (Modulation & Coding Scheme) of the data, MIMO (Multiple Input Multiple Output) parameters (e.g., MIMO mode, rank, etc.) of the data and the like. The user data is scheduled to a resource unit (RU). In this case, the resource unit is a resource allocation unit constructed with a prescribed number of subcarriers and a prescribed number of OFDM symbols. For instance, the resource unit can be constructed with 18 subcarriers and 6 OFDM symbols.

The user data is scheduled and then inputted to an encoder block. In this case, the encoder block includes a channel encoder for the inputted data, an interleaver, a rate-matcher and a modulator and performs channel coding, modulation and the like on the inputted data. In order for a receiving side to correct error generated in the course of transmitting data via a channel, the coding is performed in a manner of adding parity bits to system bits for example. As a channel coding scheme, convolution coding, turbo coding, convolution turbo coding (CTC), LDPC (low density parity check) coding or the like is usable. The channel-coded binary data is converted to a modulation symbol according to such a digital modulation scheme as QPSK, QAM and the like. Afterwards, a resource mapping block maps the modulation symbol to a resource unit allocated to a user.

In case that data symbols are transmitted via a plurality of transmitting antennas, an MIMO encoder block processes the data symbols according to a prescribed method in order to raise capacity, throughput and coverage of a system and the like. MIMO encoding scheme includes Spatial Multiplexing (SM) scheme, Spatial Time Block Coding (STBC) scheme, Spatial Frequency Block Coding (SFBC) scheme, CDD (Cyclic Delay Diversity) scheme and the like. The SM scheme is a method of maximizing a transmission rate in a manner that a transmitting side sends independent data via each antenna. The STBC scheme is a technique for enhancing link level performance by obtaining an antenna diversity gain and a coding gain in a manner of performing coding at a symbol level in a spatial region and a time region. The SFBC scheme is a technique for enhancing link level performance by obtaining an antenna diversity gain and a coding gain in a manner of performing coding at a symbol level across antenna, i.e., a spatial region, and a time region. Besides, linear dispersion coding (LDC) is a scheme generalized by combining the SM scheme and the STBC scheme together.

A beamformer/precoder block maps an outputted stream to a plurality of transmitting antennas by generating antenna-specific data according to a selected MIMO mode. The stream outputted from the beamformer/precoder block is inputted to an OFDM symbol constructing block. The OFDM symbol constructing block allocates data in a manner that the data is distributed or localized by permutation. And, the OFDM symbol constructing block configures a preamble and the like and allocates a pilot for channel estimation and the like. Moreover, the OFDM symbol constructing block performs power boosting and the like on a specific signal using feedback information and the like from a user equipment. A data signal outputted from the OFDM symbol constructing block is converted to a signal in a time domain and then propagates in the air via each transmitting antenna.

Since a packet is carried on a radio channel in a wireless communication system, signal distortion can occur in the course of transmission. In order for a receiving side to correctly receive a distorted signal, distortion of a reception signal should be corrected using channel information. In order to find out channel information, a method, which includes the steps of transmitting a common signal known to a transmitting side and a receiving side both and obtaining the channel information using a distortion extent in case of receiving the common signal via a channel, is widely used. In this case, the common signal is called a pilot or a reference signal. In case of transmitting/receiving data using multi-antenna (MIMO antenna), a correct signal can be received if a channel status between each transmitting antenna and a receiving antenna is obtained. Therefore, a separate pilot should exist for each transmitting antenna.

A pilot structure according to an embodiment of the present invention can be designed in consideration of various kinds of factors. For instance, it is able to design a pilot structure according to an embodiment of the present invention by considering an interval between pilot symbols in time and frequency domains, a data transmission rate over pilot density, and power ratios of symbols in consideration of power boosting. In addition, it is able to consider whether the power ratios of antennas in a symbol in consideration of power boosting and the MIMO transmission scheme can be efficiently supported. Particularly, in the pilot structure according to an embodiment of the present invention, the inter-pilot symbol interval can be maintained as various intervals in consideration of a coherent time for a moving speed (e.g., 120 km/h). For instance, the inter-pilot symbol interval can be maintained as 1-, 2-, 3-, or 4-symbol interval. Moreover, in consideration of a frequency selectivity characteristic, a pilot symbol can have an interval (effective coherence bandwidth) within 4 subcarriers in a frequency domain. This interval is just exemplary. A specific interval can be adjusted according to a trade-off between a required channel estimation performance of pilot and a data transmission rate in consideration of a radio channel configuration for real data transmission.

Particularly, MBS (multicast and broadcast service) can establish a single frequency network system for transmitting the same data from at least one or more base stations. As the same service is provided by multi-cell, MBS channel has such a characteristic as high frequency selectivity, long channel delay spread and the like. Hence, regarding a channel status in multi-cell transmission scheme of MBS, frequency selectivity is higher than that of unicast. Moreover, since MBS has to support a large cell (e.g., ISD: 5 km), pilot overhead should be relatively higher than that of the unicast. Yet, if the pilot overhead is raised, channel estimation performance is enhanced but frequency efficiency (spectral efficiency) of system is lowered, which is called a trade-off relation. Therefore, the pilot overhead and the channel estimation performance should be negotiated in consideration of frequency selectivity.

In case that unicast data and MBS data are multiplexed by TDM, the MBS data can be carried on whole band. And, channel estimation can be performed using the whole band as well. Therefore, in designing a pilot structure, it is able to lower an overhead relatively. Meanwhile, in case that unicast data and MBS data are multiplexed by TDM, channel estimation can be performed by a basic segment unit in consideration of a permutation method and a frequency partition method. In this case, if the same pilot overhead of the former is provided, channel estimation performance can be relatively reduced. Therefore, different pilot overhead and pattern should be taken into consideration according to a multiplexing scheme. This is an important factor that affects performance of system considerably.

In the following description, a pilot structure according to an embodiment of the present invention is explained in detail with reference to the accompanying drawings. A pilot structure exemplarily shown in an embodiment of the present invention is allocated to a resource unit including a plurality of pilot resource elements (REs) and a plurality of data resource elements (REs). In this disclosure, a pilot RE means an RE set to have a pilot allocated thereto and a data RE means an RE set to have data allocated thereto. The RE is a resource specified by one OFDM symbol and one subcarrier. Hence, the RE can be specifically specified by a combination of an OFDM symbol index and a subcarrier index. The OFDM symbol index is an integer equal to or greater than 0 and increases from a left side of a resource unit to a right side of the resource unit. In this disclosure, the subcarrier index is an integer equal to or greater than 0 and is set to increase from a top side of the resource unit to a bottom side of the resource unit, and vice versa. The plot RE and the data RE can be named a pilot subcarrier (or a pilot tone) and a data subcarrier (or a data tone), respectively.

A type/size of a resource unit, to which a pilot is allocated, can be set to have various types/sizes in consideration of such a factor as channel estimation performance, data transmission rate, channel delay spread and the like. For instance, a type/size of a resource unit can include 6 subcarriers×3 OFDM symbols, 6 subcarriers×6 OFDM symbols, 12 subcarriers×3 OFDM symbols, 12 subcarriers×6 OFDM symbols, 18 subcarriers×3 OFDM symbols, 18 subcarriers×6 OFDM symbols, 36 subcarriers×3 OFDM symbols, or 36 subcarriers×6 OFDM symbols. Moreover, a resource unit for pilot allocation can be repeated in a frequency or time domain. For instance, a pilot structure according to an embodiment of the present invention can be repeated in a time or frequency domain by a unit of frame, subframe or slot. Particularly, a prescribed number (e.g., 4) of resource units for pilot allocation are adjacent to each other on a frequency axis to construct one basic band and a plurality of basic bands are spaced apart from each other on the frequency axis, for example.

For clarity and convenience in this disclosure, the following description is mainly made for a case that a resource unit for pilot allocation is constructed with 18 subcarriers×6 OFDM symbols. A resource unit for pilot allocation can be configured in a manner that at least one symbol is decremented or incremented on a time axis according to a CP size. For instance, if one symbol is decremented, it is able to use 18×5 pilot structure resulting from excluding a last symbol. On the contrary, if one symbol is incremented, it is able to reuse a pilot structure of a first symbol. If the pilot number (e.g., pilot overhead) of each symbol differs, it is able to repeatedly use a pilot structure at a specific location for a desired purpose.

A pilot structure according to an embodiment of the present invention is allocated by a pilot pair unit. Each pilot pair includes two individual pilots for a stream or antenna. A pilot pair is allocated to two frequency resources (e.g., subcarrier or tone) neighbor to each other within one OFDM symbol. When two frequency resources organize one group, if a pilot for the same stream or antenna is repeated through an adjacent frequency resource, it is not good for efficiency of channel estimation. Hence, it is basically understood that individual pilots allocated to frequency resources of one group are provided for two streams or antennas differing from each other, by which the present invention is non-limited. In particular, a pilot structure proposed by an embodiment of the present invention is divided into an individual pilot P1 for a stream 1 or an antenna 1 (1Tx) and an individual pilot P2 for a stream 2 or an antenna 2 (2Tx). The individual pilots can switch their positions each other at the positions indicated by P1 and P2, respectively.

A pilot structure according to an embodiment of the present invention has a structure suitable for a multi-antenna (MIMO) system. In case that a wireless communication system has a plurality of transmitting antennas, a pilot structure according to an embodiment of the present invention is able to efficiently support a transmitting method (e.g., SFBC, STBC, CDD, SM, etc.) for two streams or two transmitting antennas. In particular, a pilot structure proposed by an embodiment of the present invention is able to efficiently work for MBS. Moreover, a pilot structure proposed by an embodiment of the present invention in non-limited by MBS but can be reusable for the specific purposes.

Figure 68:
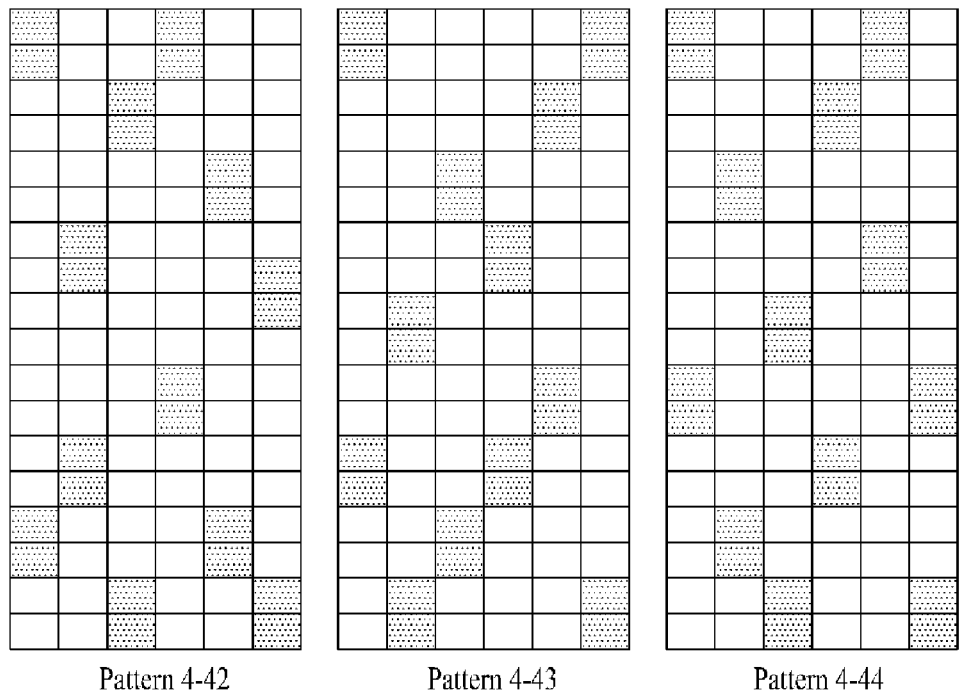

In FIGS. 4 to 68, 'sp' indicates an index for a subcarrier pair. For clarity and convenience, 'sp' is defined to increase in top-to-down direction of a resource unit, and vice versa. And, 'os' indicates an OFDM symbol index and increases in left-to-right direction of a resource unit. In case that a resource unit includes 18 subcarriers×6 OFDM symbols, 'sp' is set to one of 0 to 9 and 'os' is set to one of 0 to 5. Data is allocated to a location, to which a pilot pair is not allocated, within a resource unit. Data includes MBS data. The MBS data can be allocated by a subcarrier pair unit like the pilots. And, permutation can be performed on an MBS data allocated resource by a subcarrier pair unit. Two individual pilots forming a pilot pair can independently switch their positions within the pilot' pair by stream permutation or antenna permutation. A location, to which a pilot pair is allocated, within a resource unit can be cyclically shifted along a frequency or time axis. This cyclic shift can be determined using a cell common identifier, an MBS service identifier, an MBS zone identifier or the like. And, it is able to rotate a pilot structure shown in the drawing with respect to an x-axis, a y-axis or an origin.

FIGS. 4 to 21 are diagrams for example of allocating a pilot pair into a resource unit to set an overhead to 8.33% according to one embodiment of the present invention. The pilot structures shown in the drawings are summarized in Table 1. A numeral in Table 1 indicates a subcarrier pair index (sp) to which a pilot pair is assigned.

TABLE 1

| Pattern | os = 0 | os = 1 | os = 2 | os = 3 | os = 4 | os = 5 |
|---------|--------|--------|--------|--------|--------|--------|
| 1-1  | 0, 5     | 2    | 4, 7 | 1    | 6    | 3, 8 |
| 1-2  | 0, 5     | 2, 7 | 4    | 1, 6 | 3    | 8    |
| 1-3  | 0, 5     | 2, 7 | 4    | 6    | 1    | 3, 8 |
| 1-4  | 1, 5     | 2, 7 | 4    | 1    | 6    | 3, 8 |
| 1-5  | 1, 5     | 2    | 4, 7 | 1    | 6    | 3, 8 |
| 1-6  | 1, 5     | 2    | 4, 7 | 1    | 3, 6 | 8    |
| 1-7  | 0, 4     | 2, 7 | 5    | 3    | 1, 6 | 8    |
| 1-8  | 0        | 2, 7 | 5    | 3    | 1, 6 | 4, 8 |
| 1-9  | 0, 5     | 2    | 4, 7 | 1, 6 | 3    | 8    |
| 1-10 | 0, 7     | 2, 4 | 5    | 3    | 6    | 1, 8 |
| 1-11 | 0, 7     | 2    | 5    | 3    | 4, 6 | 1, 8 |
| 1-12 | 0, 7     | 3    | 1, 6 | 4    | 2    | 5, 8 |
| 1-13 | 0, 4     | 2, 7 | 5    | 3    | 1, 6 | 8    |
| 1-14 | 0        | 2, 7 | 5    | 3    | 1, 6 | 4, 8 |
| 1-15 | 2        | 0, 7 | 5    | 3    | 1, 8 | 4, 6 |
| 1-16 | 2, 4     | 0, 7 | 5    | 3    | 1, 8 | 6    |
| 1-17 | 0, 5     | 2, 7 | —    | 3, 6 | 1    | 4, 8 |
| 1-18 | 0, 5     | 2, 7 | 4    | 3, 6 | 1    | 8    |
| 1-19 | 0, 5     | 2, 7 | 4    | 6    | 1, 3 | 8    |
| 1-20 | 0, 7     | 2, 5 | —    | 3, 8 | 1, 6 | 4    |
| 1-21 | 0        | 2, 5 | 4, 7 | 3    | 1, 8 | 6    |
| 1-22 | 0, 4     | 2, 5 | 7    | 3    | 1, 8 | 6    |
| 1-23 | 0        | 2, 5 | 7    | 3    | 1, 8 | 4, 6 |
| 1-24 | 0, 7     | 2, 5 | —    | 3    | 1, 8 | 4, 6 |
| 1-25 | 0, 4     | 2, 7 | 5    | 3    | 1, 6 | 8    |
| 1-26 | 0, 7     | 2    | 5    | 3    | 1, 6 | 4, 8 |
| 1-27 | 0, 7     | 2, 5 | —    | 3    | 1, 8 | 4, 6 |
| 1-28 | 0, 7     | 2    | 5    | 3    | 1, 8 | 4, 6 |
| 1-29 | 5(+1)    | 0, 2 | 4, 7 | 1    | 6, 8 | 3    |
| 1-30 | 0, 6     | 4    | 2    | 7    | 1, 5 | 3, 8 |
| 1-31 | 0, 5(+1) | 4    | 2, 7 | 1    | 6    | 3, 8 |
| 1-32 | 0, 5     | 2, 4 | 7    | 1, 6 | 3    | 8    |
| 1-33 | 0, 5     | 2    | 7    | 1, 4 | 3    | 6, 8 |

TABLE 1-continued

| Pattern | os = 0 | os = 1 | os = 2 | os = 3 | os = 4 | os = 5 |
|---|---|---|---|---|---|---|
| 1-34 | 0, 5 | 2 | 7 | 1, 6 | 3 | 4, 8 |
| 1-35 | 0, 7 | 2 | 4, 6 | 3 | 1 | 5, 8 |
| 1-36 | 0, 7 | 2 | 4 | 6 | 1, 3 | 5, 8 |
| 1-37 | 0, 7 | 2 | 4 | 1, 6 | 3 | 5, 8 |
| 1-38 | 0, 5 | 2 | 7 | 1, 4 | 8 | 3, 6 |
| 1-39 | 0, 5 | 2, 7 | — | 1, 4 | 6, 8 | 3 |
| 1-40 | 6 | 0, 3 | 7 | 1, 4 | 8 | 2, 5 |
| 1-41 | 0, 7 | 2, 4 | 6 | 3 | 1 | 5, 8 |
| 1-42 | 0, 7 | 2, 4 | 6 | 3 | 1 | 5, 8 |
| 1-43 | 0 | 2, 7 | 4 | 1, 6 | 3 | 5, 8 |
| 1-44 | 0, 3 | 7 | 1, 4 | 8 | 2, 5 | 6 |
| 1-45 | 0, 3 | 6 | 1, 4 | 8 | 2, 5 | 7 |
| 1-46 | 0, 3 | 6 | 1, 4 | 7 | 2, 5 | 8 |
| 1-47 | 0, 5 | 2, 7 | 4 | 1, 6 | 3 | 8 |
| 1-48 | 0 | 5 | 2, 7 | 4 | 1, 6 | 3, 8 |
| 1-49 | 0, 5 | 2, 7 | 4 | 1, 6 | 3 | 8 |
| 1-50 | 0, 3 | 6 | 1, 4 | 7 | 2, 5 | 8 |
| 1-51 | 0 | 2, 6 | 4 | 1, 7 | 5 | 3, 8 |
| 1-52 | 0 | 3, 6 | 1 | 5, 7 | 2 | 4, 8 |
| 1-53 | 0 | 3, 6 | 1 | 5 | 2, 7 | 3(+1), 8 |
| 1-54 | 0 | 3, 6 | 1 | 4, 7 | 2 | 5, 8 |
| 1-55 | 0, 6 | 4 | 2, 7 | — | 1, 5 | 3, 8 |
| 1-56 | 0, 7 | 2, 4 | 6 | 3 | 1 | 5, 8 |

FIGS. 22 to 37 are diagrams for example of allocating a pilot pair into a resource unit to set an overhead to 9.25% according to one embodiment of the present invention. The pilot structures shown in the drawings are summarized in Table 2. A numeral in Table 2 indicates a subcarrier pair index (sp) to which a pilot pair is assigned.

TABLE 2

| Pattern | os = 0 | os = 1 | os = 2 | os = 3 | os = 4 | os = 5 |
|---|---|---|---|---|---|---|
| 2-1 | 0, 4(+1) | 3(+1), 8 | 1(+1) | 0, 4(+1) | 3(+1), 8 | 6 |
| 2-2 | 0, 6 | 2, 8 | 4 | 0, 6 | 2, 8 | 4 |
| 2-3 | 0, 4 | 2, 7 | 5 | 3 | 1, 6 | 4, 8 |
| 2-4 | 0, 5 | 2 | 4, 7 | 1, 6 | 3 | 5, 8 |
| 2-5 | 0, 7 | 2, 8 | 5 | 3 | 4, 6 | 1, 8 |
| 2-6 | 0, 7 | 3 | 1, 6 | 4 | 2 | 0, 5, 8 |
| 2-7 | 0, 4 | 2, 7 | 5 | 3 | 1, 6 | 4, 8 |
| 2-8 | 2 | 0, 7 | 5 | 3, 6(+1) | 1, 8 | 4, 6 |
| 2-9 | 2, 4 | 0, 7 | 5 | 3 | 1, 8 | 4, 6 |
| 2-10 | 0, 5 | 2, 7 | 4 | 3, 6 | 1 | 4, 8 |
| 2-11 | 0, 5 | 2, 7 | 4 | 6 | 1, 3 | 5, 8 |
| 2-12 | 0, 7 | 2, 5 | 4 | 3, 8 | 1, 6 | 4 |
| 2-13 | 0, 8 | 2, 5 | 4, 7 | 3 | 1, 8 | 6 |
| 2-14 | 0, 4 | 2, 5 | 7 | 3 | 1, 8 | 4, 6 |
| 2-15 | 0, 6 | 2, 5 | 7 | 3 | 1, 8 | 4, 6 |
| 2-16 | 0, 7 | 2, 5 | 6 | 3 | 1, 8 | 4, 6 |
| 2-17 | 0, 4 | 2, 7 | 5 | 3 | 1, 6 | 4, 8 |
| 2-18 | 0, 7 | 2, 8 | 5 | 3 | 1, 6 | 4, 8 |
| 2-19 | 5, (+1) | 0, 2 | 4, 7 | 1 | 6, 8 | 2, 5 |
| 2-20 | 0, 6 | 4, 8 | 2 | 7 | 1, 5 | 3, 8 |
| 2-21 | 0, 5(+1) | 4 | 2, 7 | 1 | 4, 6 | 3, 8 |
| 2-22 | 0, 5 | 2, 4 | 7 | 1, 6 | 3 | 5, 8 |
| 2-23 | 0, 5 | 2, 8 | 7 | 1, 4 | 3 | 6, 8 |
| 2-24 | 0, 5 | 2 | 4, 7 | 1, 6 | 3 | 4, 8 |
| 2-25 | 0, 7 | 2 | 4, 6 | 3, 7 | 1 | 5, 8 |
| 2-26 | 0, 7 | 2, 5 | 4 | 6 | 1, 3 | 5, 8 |
| 2-27 | 0, 7 | 2, 5 | 4 | 1, 6 | 3 | 5, 8 |
| 2-28 | 0, 5 | 2 | 7 | 1, 4 | 0, 8 | 3, 6 |
| 2-29 | 0, 5 | 2, 7 | — | 1, 4 | 6, 8 | 0, 3 |
| 2-30 | 2, 6 | 0, 3 | 7 | 1, 4 | 8 | 2, 5 |
| 2-31 | 0, 8 | 2, 5 | 4, 7 | 3 | 1, 8 | 6 |
| 2-32 | 0, 4 | 2, 7 | 5 | 3 | 1, 6 | 4, 8 |
| 2-33 | 0, 5 | 2, 7 | 4 | 1, 6 | 3 | 5, 8 |
| 2-34 | 0, 3 | 7 | 1, 4 | 8 | 2, 5 | 0, 6 |
| 2-35 | 0, 3 | 6 | 1, 4 | 8 | 2, 5 | 0, 7 |
| 2-36 | 0, 3 | 6 | 1, 4 | 7 | 2, 5 | 0, 8 |
| 2-37 | 0, 5 | 2, 7 | 4 | 1, 6 | 3 | 5, 8 |
| 2-38 | 0, 3 | 5 | 2, 7 | 4 | 1, 6 | 3, 8 |
| 2-39 | 0, 5 | 2, 7 | 4 | 1, 6 | 3 | 5, 8 |
| 2-40 | 0, 3 | 6 | 1, 4 | 7 | 2, 5 | 0, 8 |

TABLE 2-continued

| Pattern | os = 0 | os = 1 | os = 2 | os = 3 | os = 4 | os = 5 |
|---|---|---|---|---|---|---|
| 2-41 | 0, 8 | 2, 6 | 4 | 1, 7 | 5 | 3, 8 |
| 2-42 | 0, 7 | 3, 6 | 1 | 5, 7 | 2 | 4, 8 |
| 2-43 | 0, 7 | 3, 6 | 1 | 5 | 2, 7 | 3(+1), 8 |
| 2-44 | 0 | 3, 6 | 1 | 4, 7 | 2 | 0, 5, 8 |
| 2-45 | 0, 6 | 4 | 2, 7 | — | 1, 5 | 0, 3, 8 |
| 2-46 | 0, 7 | 2, 4 | 6 | 3, 7 | 1 | 5, 8 |
| 2-47 | 0, 7 | 2, 4 | 6 | 3, 7 | 1 | 5, 8 |

FIGS. 38 to 53 are diagrams for example of allocating a pilot pair into a resource unit to set an overhead to 10.1% according to one embodiment of the present invention. The pilot structures shown in the drawings are summarized in Table 3. A numeral in Table 3 indicates a subcarrier pair index (sp) to which a pilot pair is assigned.

TABLE 3

| Pattern | os = 0 | os = 1 | os = 2 | os = 3 | os = 4 | os = 5 |
|---|---|---|---|---|---|---|
| 3-1 | 0, 4, 8 | 2, 7 | 5 | 3 | 1, 6 | 4, 8 |
| 3-2 | 0, 5 | 2, 8 | 4, 7 | 1, 6 | 3 | 5, 8 |
| 3-3 | 0, 5 | 2, 7 | 4 | 0, 6 | 1, 3 | 5, 8 |
| 3-4 | 0, 4 | 2, 7 | 0, 5 | 3 | 1, 6 | 4, 8 |
| 3-5 | 0, 7 | 2, 8 | 5 | 0, 3 | 4, 6 | 1, 8 |
| 3-6 | 0, 7 | 3 | 1, 6 | 4, 7 | 2 | 0, 5, 8 |
| 3-7 | 2 | 0, 7 | 2, 5 | 3, 6(+1) | 1, 8 | 4, 6 |
| 3-8 | 2, 4 | 0, 7 | 2, 5 | 3 | 1, 8 | 4, 6 |
| 3-9 | 0, 5 | 2, 7 | 4 | 3, 6 | 1, 7 | 4, 8 |
| 3-10 | 0, 7 | 2, 8 | 5 | 0, 3 | 4, 6 | 1, 8 |
| 3-11 | 0, 4 | 2, 5 | 1, 7 | 3 | 1, 8 | 4, 6 |
| 3-12 | 0, 6 | 2, 5 | 7 | 0, 3 | 1, 8 | 4, 6 |
| 3-13 | 0, 7 | 2, 5 | 1, 4 | 3, 8 | 1, 6 | 4 |
| 3-14 | 0, 7 | 2, 8 | 5 | 3, 7 | 1, 6 | 4, 8 |
| 3-15 | 0, 7 | 2, 5 | 6 | 0, 3 | 1, 8 | 4, 6 |
| 3-16 | 0, 8 | 2, 5 | 4, 7 | 3 | 1, 8 | 0, 6 |
| 3-17 | 0, 6 | 4, 8 | 2, 6 | 7 | 1, 5 | 3, 8 |
| 3-18 | 0, 5 | 2, 4 | 7 | 1, 6 | 0, 3 | 5, 8 |
| 3-19 | 0, 6 | 4, 8 | 2, 7 | 3 | 0, 5 | 1, 8 |
| 3-20 | 0, 5 | 2, 8 | 7 | 1, 4 | 0, 3 | 6, 8 |
| 3-21 | 0, 5 | 2 | 4, 7 | 1, 6 | 0, 3 | 4, 8 |
| 3-22 | 0, 7 | 2, 5 | 4, 6 | 3, 7 | 1 | 5, 8 |
| 3-23 | 0, 7 | 2, 5 | 4 | 0, 6 | 1, 3 | 5, 8 |
| 3-24 | 0, 7 | 2, 5 | 4 | 1, 6 | 3, 7 | 5, 8 |
| 3-25 | 0, 5 | 2 | 3, 7 | 1, 4 | 0, 8 | 3, 6 |
| 3-26 | 0, 5 | 2, 7 | 3 | 1, 4 | 6, 8 | 0, 3 |
| 3-27 | 2, 6 | 0, 3 | 5, 7 | 1, 4 | 8 | 2, 5 |
| 3-28 | 0, 3 | 5, 7 | 1, 4 | 8 | 2, 5 | 0, 6 |
| 3-29 | 0, 3 | 6 | 1, 4 | 3, 8 | 2, 5 | 0, 7 |
| 3-30 | 0, 3 | 6, 8 | 1, 4 | 7 | 2, 5 | 0, 8 |
| 3-31 | 0, 5 | 2, 7 | 4, 8 | 1, 6 | 3 | 5, 8 |
| 3-32 | 0, 3 | 5, 8 | 2, 7 | 4 | 1, 6 | 3, 8 |
| 3-33 | 0, 5 | 2, 7 | 4, 8 | 1, 6 | 3 | 5, 8 |
| 3-34 | 0, 3 | 6, 8 | 1, 4 | 7 | 2, 5 | 0, 8 |
| 3-35 | 0, 8 | 2, 6 | 4 | 1, 7 | 0, 5 | 3, 8 |
| 3-36 | 0, 7 | 3, 6 | 1 | 5, 7 | 0, 2 | 4, 8 |
| 3-37 | 0, 7 | 3, 6 | 1 | 0, 5 | 2, 7 | 3(+1), 8 |
| 3-38 | 0, 8 | 3, 6 | 1 | 4, 7 | 2, 5 | 0, 8 |
| 3-39 | 0, 6 | 4, 8 | 2, 7 | 3 | 1, 5 | 0, 8 |
| 3-40 | 0, 5 | 2, 7 | 4, 8 | 1, 6 | 3 | 5, 8 |
| 3-41 | 0, 4 | 2, 5 | 1, 7 | 3 | 1, 8 | 4, 6 |
| 3-42 | 0, 4 | 2, 7 | 5 | 3, 8 | 1, 6 | 4, 8 |
| 3-43 | 0, 5 | 2, 8 | 7 | 1, 4 | 0, 3 | 6, 8 |
| 3-44 | 0, 7 | 2, 5 | 4 | 0, 6 | 1, 3 | 5, 8 |
| 3-45 | 0, 8 | 3, 6 | 1 | 4, 7 | 2, 5 | 0, 8 |
| 3-46 | 0, 7 | 2, 4 | 0, 6 | 3, 7 | 1 | 5, 8 |
| 3-47 | 0, 7 | 2, 4 | 0, 6 | 3, 7 | 1 | 5, 8 |

FIGS. 54 to 68 are diagrams for example of allocating a pilot pair into a resource unit to set an overhead to 11.1% according to one embodiment of the present invention. The pilot structures shown in the drawings are summarized in Table 4. A numeral in Table 4 indicates a subcarrier pair index (sp) to which a pilot pair is assigned.

TABLE 4

| Pattern | os = 0 | os = 1 | os = 2 | os = 3 | os = 4 | os = 5 |
|---|---|---|---|---|---|---|
| 4-1 | 0, 4 | 1, 6 | 3, 7 | 0, 5 | 2, 6 | 3, 8 |
| 4-2 | 0, 4 | 2, 6 | 3, 8 | 0, 5 | 4, 7 | 1, 8 |
| 4-3 | 0, 4 | 2, 6 | 3, 7 | 1, 5 | 2, 6 | 4, 8 |
| 4-4 | 0, 4 | 2, 6 | 3, 8 | 0, 5 | 2, 6 | 4, 8 |
| 4-5 | 0, 4 | 1, 6 | 2, 8 | 0, 6 | 2, 7 | 4, 8 |
| 4-6 | 0, 5 | 2, 6 | 3, 7 | 1, 5 | 2, 6 | 4, 8 |
| 4-7 | 0, 5 | 1, 6 | 3, 8 | 0, 5 | 2, 7 | 3, 8 |
| 4-8 | 0, 4 | 1, 6 | 3, 7 | 0, 5 | 2, 7 | 3, 8 |
| 4-9 | 0, 4 | 2, 6 | 3, 7 | 1, 5 | 2, 6 | 4, 8 |
| 4-10 | 0, 4 | 2, 7 | 3, 8 | 0, 5 | 1, 6 | 4, 8 |
| 4-11 | 0, 4 | 1, 6 | 3, 8 | 0, 5 | 2, 7 | 4, 8 |
| 4-12 | 0, 4, 8 | 2, 7 | 1, 5 | 3 | 1, 6 | 4, 8 |
| 4-13 | 0, 5 | 2, 8 | 4, 7 | 1, 6 | 0, 3 | 5, 8 |
| 4-14 | 0, 5 | 2, 7 | 4, 8 | 0, 6 | 1, 3 | 5, 8 |
| 4-15 | 0, 4 | 2, 7 | 0, 5 | 3, 8 | 1, 6 | 4, 8 |
| 4-16 | 0, 7 | 3, 5 | 1, 6 | 4, 7 | 2 | 0, 5, 8 |
| 4-17 | 0, 6 | 2, 5 | 4, 7 | 0, 3 | 1, 8 | 4, 6 |
| 4-18 | 2, 5 | 0, 7 | 2, 5 | 3, 6(+1) | 1, 8 | 4, 6 |
| 4-19 | 2, 4 | 0, 7 | 2, 5 | 3, 6 | 1, 8 | 4, 6 |
| 4-20 | 0, 5 | 2, 7 | 0, 4 | 3, 6 | 1, 7 | 4, 8 |
| 4-21 | 0, 7 | 2, 5 | 1, 4 | 3, 8 | 1, 6 | 0, 4 |
| 4-22 | 0, 7 | 2, 8 | 0, 5 | 3, 7 | 1, 6 | 4, 8 |
| 4-23 | 0, 7 | 2, 5 | 4, 6 | 0, 3 | 1, 8 | 4, 6 |
| 4-24 | 0, 6 | 4, 8 | 2, 6 | 0, 7 | 1, 5 | 3, 8 |
| 4-25 | 0, 5 | 2, 4 | 3, 7 | 1, 6 | 0, 3 | 5, 8 |
| 4-26 | 0, 6 | 4, 8 | 2, 7 | 3, 6 | 0, 5 | 1, 8 |
| 4-27 | 0, 5 | 2, 8 | 4, 7 | 1, 6 | 0, 3 | 4, 8 |
| 4-28 | 0, 7 | 2, 5 | 4, 6 | 3, 7 | 1, 4 | 5, 8 |
| 4-29 | 0, 7 | 2, 5 | 4, 8 | 1, 6 | 3, 7 | 5, 8 |
| 4-30 | 0, 5 | 2, 8 | 3, 7 | 1, 4 | 0, 8 | 3, 6 |
| 4-31 | 0, 5 | 2, 7 | 3, 8 | 1, 4 | 6, 8 | 0, 3 |
| 4-32 | 2, 6 | 0, 3 | 5, 7 | 1, 4 | 0, 8 | 2, 5 |
| 4-33 | 0, 3 | 5, 7 | 1, 4 | 3, 8 | 2, 5 | 0, 6 |
| 4-34 | 0, 3 | 2, 6 | 1, 4 | 3, 8 | 2, 5 | 0, 7 |
| 4-35 | 0, 3 | 6, 8 | 1, 4 | 3, 7 | 2, 5 | 0, 8 |
| 4-36 | 0, 5 | 2, 7 | 4, 8 | 1, 6 | 0, 3 | 5, 8 |
| 4-37 | 0, 3 | 5, 8 | 2, 7 | 0, 4 | 1, 6 | 3, 8 |
| 4-38 | 0, 5 | 2, 7 | 4, 8 | 1, 6 | 0, 3 | 5, 8 |
| 4-39 | 0, 3 | 6, 8 | 1, 4 | 3, 7 | 2, 5 | 0, 8 |
| 4-40 | 0, 8 | 2, 6 | 4, 8 | 1, 7 | 0, 5 | 3, 8 |
| 4-41 | 0, 7 | 3, 6 | 1, 8 | 5, 7 | 0, 2 | 4, 8 |
| 4-42 | 0, 7 | 3, 6 | 1, 8 | 0, 5 | 2, 7 | 3(+1), 8 |
| 4-43 | 0, 6 | 4, 8 | 2, 7 | 3, 6 | 1, 5 | 0, 8 |
| 4-44 | 0, 5 | 2, 7 | 4, 8 | 1, 6 | 0, 3 | 5, 8 |

Figures 22, 23:
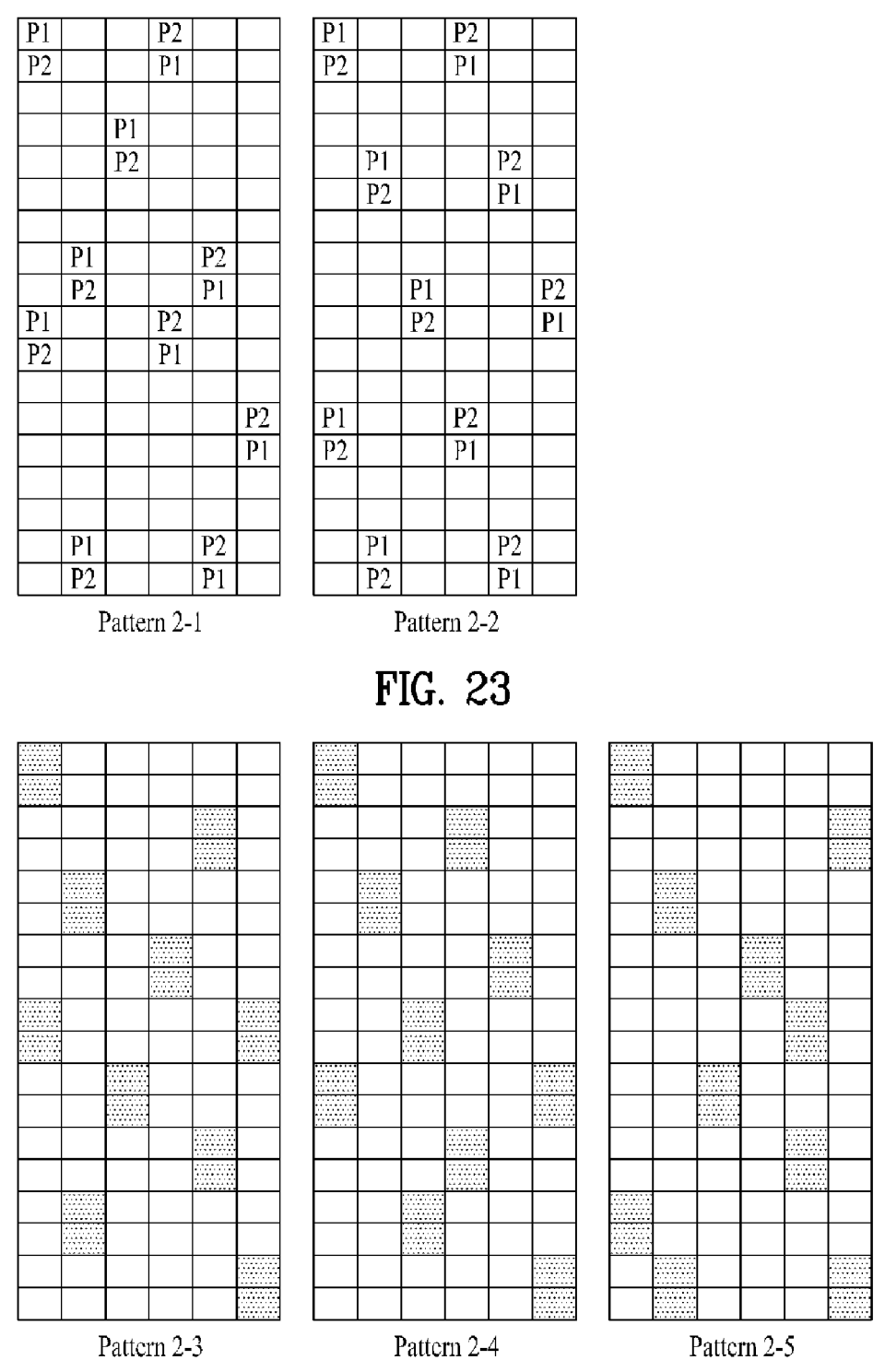

FIGS. 69 to 74 are diagrams of simulation results for a pilot structure allocated according to one embodiment of the present invention. For this simulation, the pattern 2-2 shown in FIG. 22 is used. Pilot patterns and conditions used for this simulation are shown in Table 5 and Table 6, respectively.

TABLE 5

|  | os = 0 | os = 1 | os = 2 | os = 3 | os = 4 | os = 5 |
|---|---|---|---|---|---|---|
| sp = 0 | P1P2 | * | * | P2P1 | * | * |
| sp = 1 | * | * | * | * | * | * |
| sp = 2 | * | P1P2 | * | * | P2P1 | * |
| sp = 3 | * | * | * | * | * | * |
| sp = 4 | * | * | P1P2 | * | * | P2P1 |
| sp = 5 | * | * | * | * | * | * |
| sp = 6 | P1P2 | * | * | P2P1 | * | * |
| sp = 7 | * | * | * | * | * | * |
| sp = 8 | * | P1P2 | * | * | P2P1 | * |

In Table 5, 'sp' indicates a subcarrier pair index and 'os' indicates an OFDM symbol index. 'P1' indicates a pilot for a first stream (or antenna) and 'P2' indicates a pilot for a second stream (or antenna). And, '*' indicates data.

TABLE 6

| Parameter | Values |
|---|---|
| Channel Bandwidth | 10 MHz |
| Over-sampling Factor | 28/25 |
| Fast Fourier Transform (FFT) Size | 1024 |
| Cyclic Prefix (CP) ratio | ⅛ |
| Resource Unit | RU (18 subcarriers × 6 OFDM symbols) |
| Permutation | Tone-pair Logical Distributed RU (DRU) |
| Data Size | 4PRU |
| Channel Code | IEEE 802.16e Convolution Turbo Coding (CTC) |
| Modulation and Coding scheme (MCS) | QPSK½, ¾; 16QAM½, ¾; 64QAM½ |
| Channel decoding | Max-log-Map, max 8 iteration |
| Channel condition | Inter-Site Cell Distance (ISD) 1500 m and ISD 5000 m, 3 km/h and 120 km/h |
| Channel estimation method | 2D-MMSE, Window size = 3PRU |
| The number of antennas | 2Tx, 2Rx |
| MIMO schemes | Rate-1 SFBC@ISD1500&ISD5000 Rate-2 SM@ISD1500 only |
| MIMO Receiver | MRC(SFBC), Soft-MMSE(SM) |
| Scenarios | Noise limited |
| Pilot boosting | 0 dB and 5 dB |

In the above conditions, a pilot structure is transmitted by a unit of PRU group (e.g., subband) including 4 consecutive PRUs in a frequency domain and PRU groups are set to be spaced apart from each other in the frequency domain. Data is allocated in a manner of being spread by a subcarrier pair unit within each OFDM symbol according to tone-pair DRU permutation. Simulation is performed on a case of small cell (e.g., ISD: 1,500 m) and a case of large cell (e.g., ISD: 5,500 m) both. In this disclosure, for simplicity, the case of IDS of 1,500 m is shown only.

Figure 69:
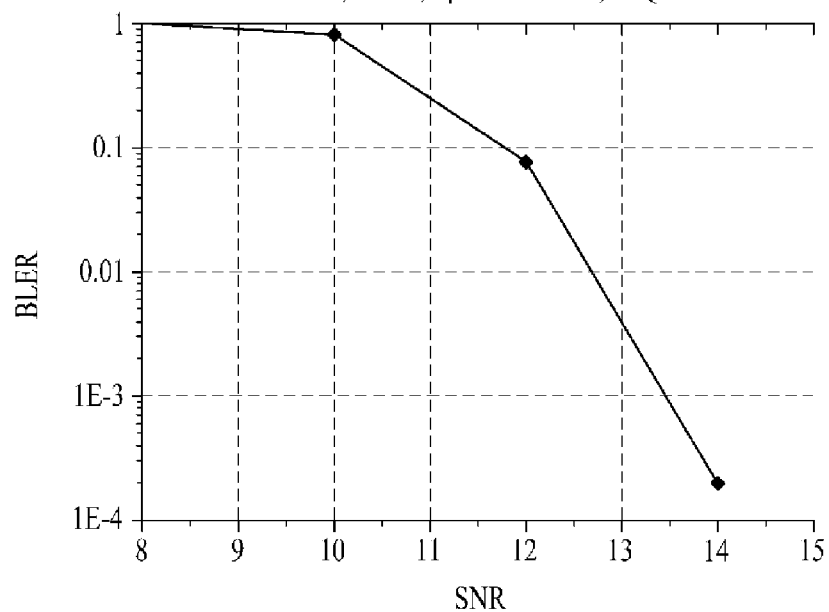
FIGS. 69 to 74 are diagrams of simulation results for a pilot structure allocated according to one embodiment of the present invention.
Figure 70:
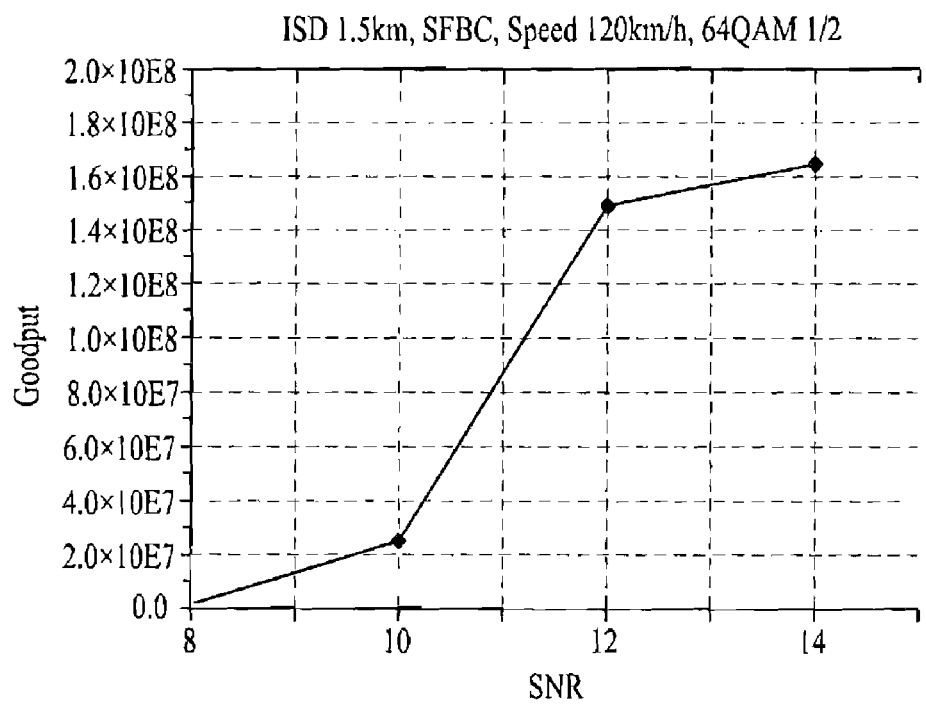

FIG. 69 and FIG. 70 assume a case that an inter-site cell distance (ISD) is 1.5 km and that a user equipment is moving at 120 km/h. Spatial frequency block coding (SFBC) is applied. Data is coded at ½ coding rate and is modulated by 64 QAM scheme. Referring to FIG. 69, it can be observed that BLER (block error rate) is about 0.85/0.08/0.0002, if SNR (signal to noise ratio) is 10/12/14. The BLER indicates a rate of erroneous coding blocks among whole received coding blocks. Referring to FIG. 70, if SNR is 10/12/14, it can be observed that goodput is about $2.4 \times 10^7/1.52 \times 10^8/1.64 \times 10^8$. In this case, 'goodput' is used together with throughput and indicates a successful packet amount per unit time (bits/second). A value resulting from normalizing the goodput with effective channel bandwidth is represented as SE (spectral efficiency).

Figure 71:
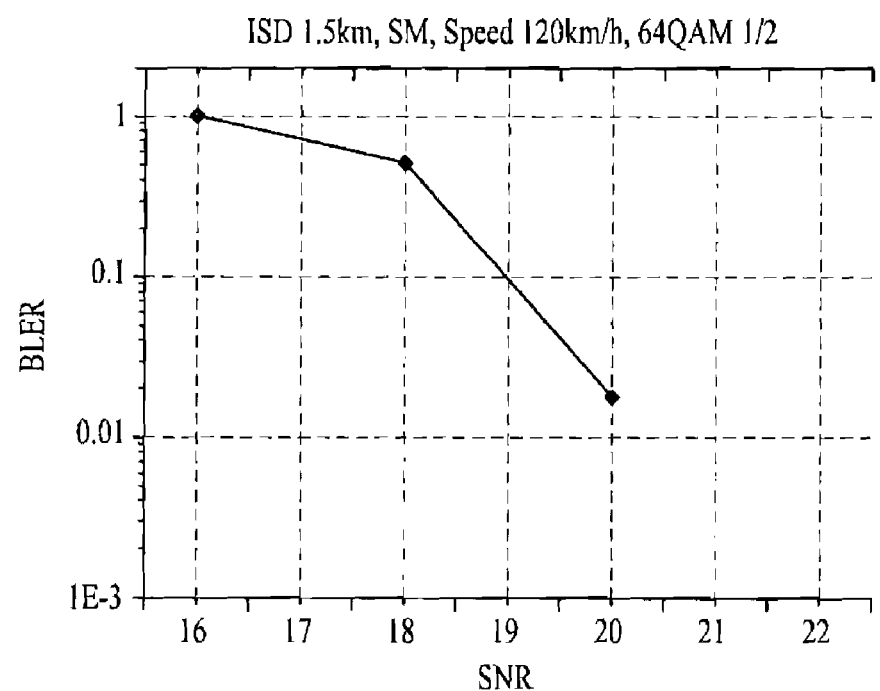
Figure 72:
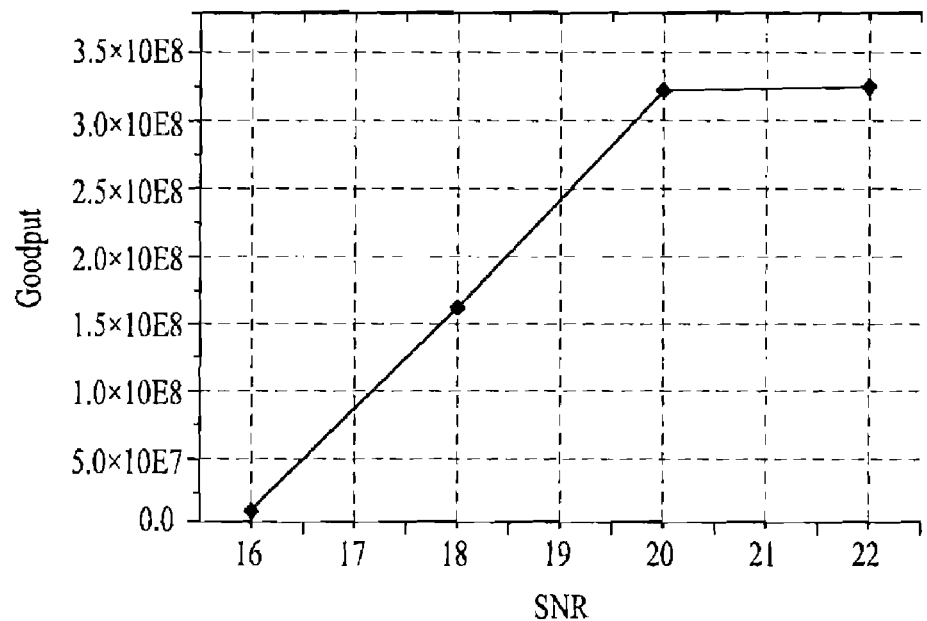

FIG. 71 and FIG. 72 assume a case that an inter-site cell distance (ISD) is 1.5 km and that a user equipment is moving at 120 km/h. Spatial multiplexing (SM) is applied. Data is coded at ½ coding rate and is modulated by 64 QAM scheme. Referring to FIG. 71, it can be observed that BLER (block error rate) is about 1.0/0.5/0.019, if SNR (signal to noise ratio) is 16/18/20. Referring to FIG. 72, if SNR is 18/20/22, it can be observed that goodput is about $1.6 \times 10^8/3.23 \times 10^8/3.27 \times 10^8$.

Figure 73:
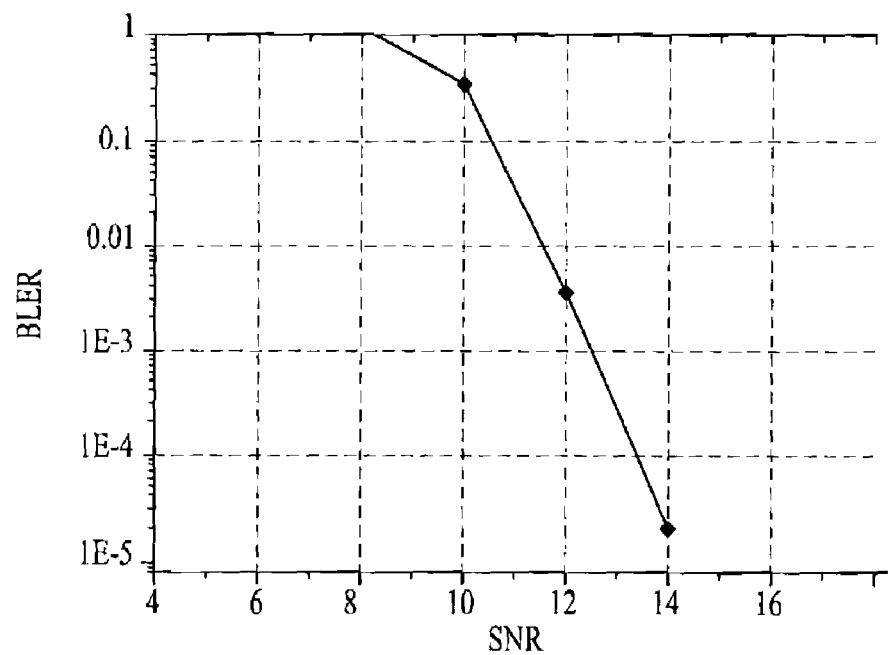
Figure 74:
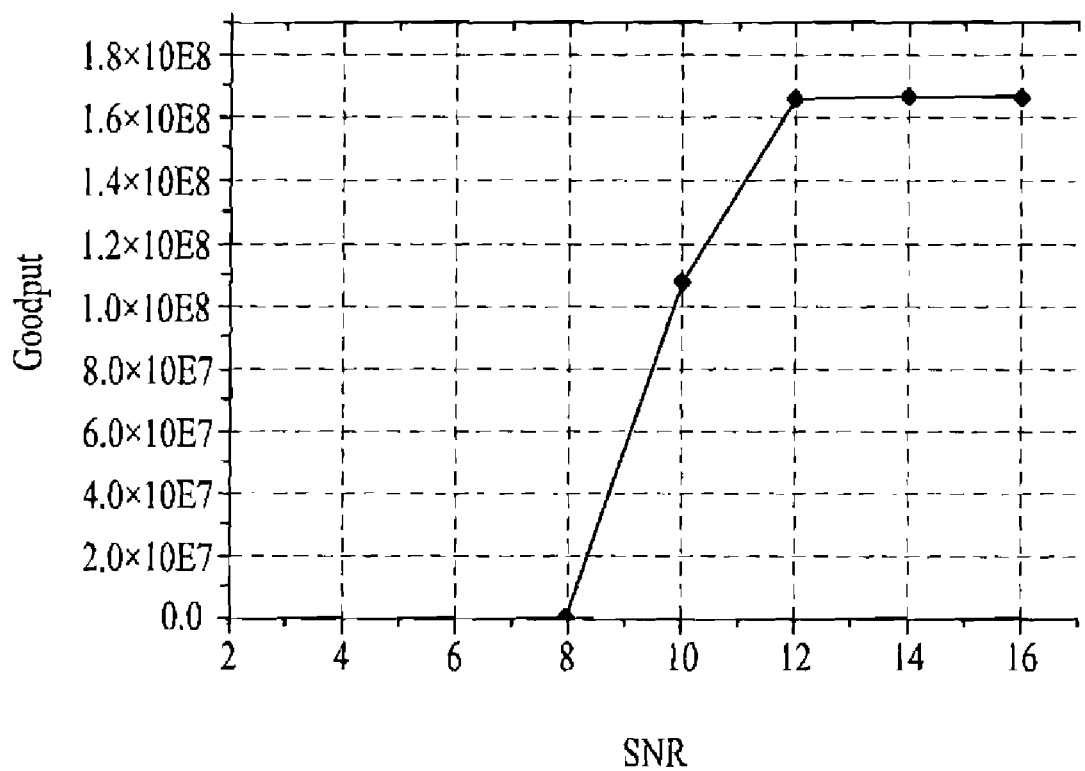

FIG. 73 and FIG. 74 assume a case that an inter-site cell distance (ISD) is 1.5 km and that a user equipment is moving at 120 km/h. Spatial frequency block coding (SFBC) is applied. Data is coded at ¾ coding rate and is modulated by 64 QAM scheme. Power for transmitting pilots is boosted by 5 dB. Referring to FIG. 73, it can be observed that BLER (block error rate) is about 0.36/0.003/0.00002, if SNR (signal to noise ratio) is 10/12/14. Referring to FIG. 74, if SNR is 10/12/14, it can be observed that goodput is about $1.03 \times 10^8 / 1.62 \times 10^8 / 1.63 \times 10^8$.

Figure 75:
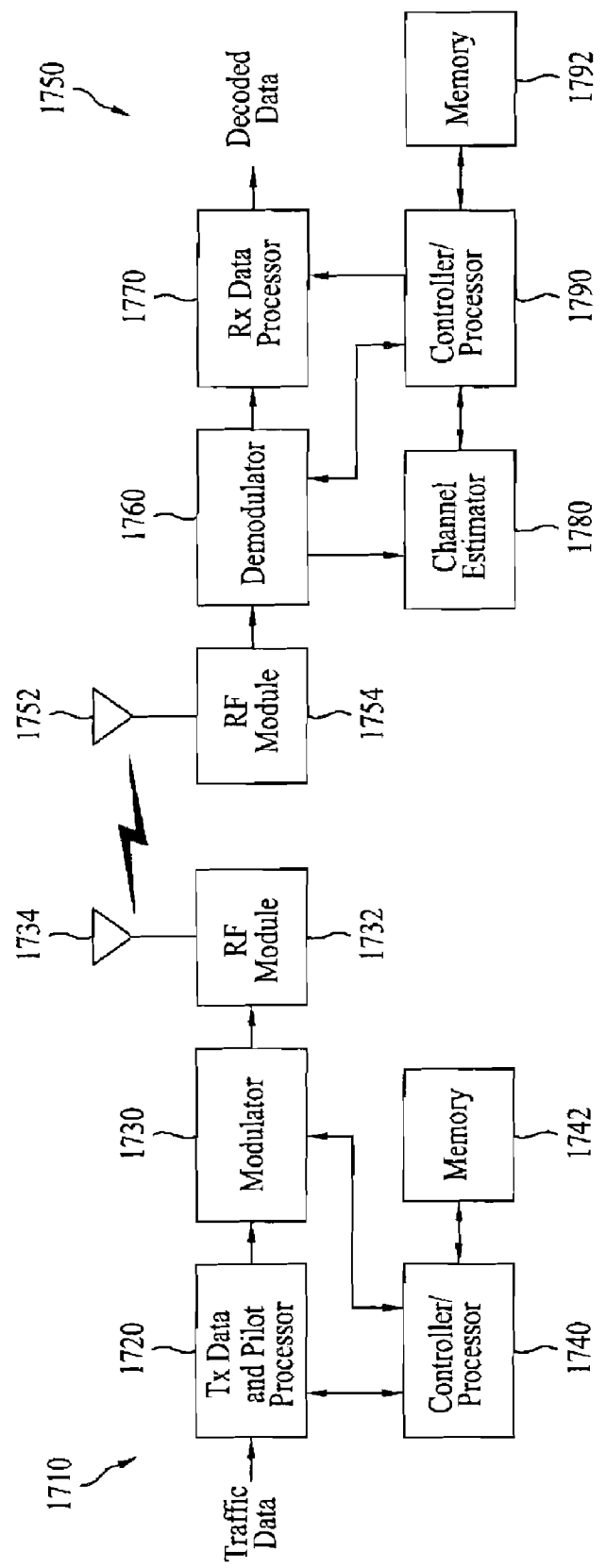
FIG. 75 is a diagram for a base station and user equipment applicable to one embodiment of the present invention.

FIG. 75 is a diagram for examples of a base station and user equipment applicable to one embodiment of the present invention. In downlink, a transmitter 1710 is a part of a base station and a receiver 1750 is a part of a user equipment. In uplink, a transmitter 1710 is a part of a user equipment and a receiver 1750 is a part of a base station.

Referring to FIG. 75, in a transmitter 1710, a Tx data and pilot processor 1720 generates data symbols by performing encoding, interleaving and symbol mapping on data (e.g., traffic data and signaling). And, the pilot processor 1720 generates pilot symbols and then multiplexes data and pilot symbols with each other according to a pattern proposed by an embodiment of the present invention. A modulator 1730 generates transmission symbols according to a wireless access scheme. The wireless access scheme includes FDMA, TDMA, CDMA, SC-FDMA, MC-FDMA, OFDMA and any combination thereof. A radio frequency (RF) module 1732 generates an RF signal to be transmitted through an antenna 1734 from a transmission symbol by performing signal processing (e.g., analog conversion, amplification, filtering and frequency uplink transform). Boosting of power of pilot symbol transmitted to a receiver 1750 can be implemented in various ways according to implementation schemes. For instance, transmission power of pilot symbol can be adjusted by giving a weight to an input value for the modulator 1730 or an output value from the modulator 1730. And, transmission power of pilot symbol can be adjusted by the RF module 1732. a controller/processor 1740 monitors and controls operations of the modules existing in the transmitter 1710. And program codes and data are stored in a memory 1742.

The receiver 1750 receives a signal transmitted by the transmitter 1710 and then forwards it to an RF module 1754. The RF module 1754 provides input samples by performing signal processing (e.g., filtering, amplification, frequency downlink transform, digitalization, etc.) on the received signal. A demodulator 1760 performs data detection (or equalization) on the received data values using a channel estimation value and then provides data symbol estimation values. An Rx data processor 1770 performs symbol demapping, deinterleaving and decoding on the data symbol estimation values and then provides decoded data. Generally, the processings by the demodulator 1760 and the Rx data processor 1770 in the receiver 1750 are mutually supplemented with the processings of the modulator 1730 an the Tx data and pilot processor 1720 in the transmitter, respectively. A controller/processor 1790 monitors and controls operations of the modules existing in the receiver 1750. And program codes and data are stored in a memory 1792.

The modules exemplarily shown in FIG. 75 are provided for the description only. The transmitter and/or the receiver can further include necessary module(s). The modules/functions are omitted in part or can be separated into different modules. And, at least two modules can be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of downlink transmitting a resource unit by a base station in a wireless communication system, the method comprising:

forming the resource unit including a plurality of pilot resource elements (REs) and a plurality of data resource elements;

allocating a plurality of pilot pairs to have a prescribed subcarrier interval and a prescribed OFDM (orthogonal frequency division multiplexing) symbol interval within the resource unit; and transmitting the resource unit to a user equipment via multi-antenna, wherein each of the plurality of pilot pairs includes individual pilots for two different streams or antennas, wherein locations of the plurality of pilot pairs within the resource unit are represented as a following pattern table:

[Pattern table]

|        | os = 0 | os = 1 | os = 2 | os = 3 | os = 4 | os = 5 |
|--------|--------|--------|--------|--------|--------|--------|
| sp = 0 | PP     | *      | *      | PP     | *      | *      |
| sp = 1 | *      | *      | *      | *      | *      | *      |
| sp = 2 | *      | PP     | *      | *      | PP     | *      |
| sp = 3 | *      | *      | *      | *      | *      | *      |
| sp = 4 | *      | *      | PP     | *      | *      | PP     |
| sp = 5 | *      | *      | *      | *      | *      | *      |
| sp = 6 | PP     | *      | *      | PP     | *      | *      |
| sp = 7 | *      | *      | *      | *      | *      | *      |
| sp = 8 | *      | PP     | *      | *      | PP     | *      | where the sp indicates a subcarrier pair index, the os indicates an OFDM symbol index, the PP indicates the pilot pair including the individual pilots for the two different streams or antennas, and the * indicates an allocated location of data, wherein locations of the individual pilots within the PP can be independently switched to each other, and wherein the PP can be cyclically shifted along a time or frequency axis.

2. The method of claim 1, wherein the resource unit comprises 18 subcarriers×3 OFDM symbols, 18 subcarriers×6 OFDM symbols, 36 subcarriers×3 OFDM symbols or 36 subcarriers×6 OFDM symbols.

3. The method of claim 1, wherein 4 resource units are adjacent to each other on a frequency axis to construct one basic band, wherein each basic bands is spaced apart from each other on the frequency axis.

4. The method of claim 1, wherein the resource unit is used for multicast/broadcast service.

5. The method of claim 1, wherein each of the plurality of pilot pairs is allocated to two frequency resources adjacent to each other within one OFDM symbol.

6. The method of claim 1, wherein an interval among the plurality of pilot pairs is set to 4 subcarriers or below in a frequency domain.

7. The method of claim 1, wherein positions of the individual pilots within each pilot pair are determined independently.

8. The method of claim 7, wherein positions of the individual pilots within each pilot pair are switched by a unit of a prescribed number of OFDM symbols in a time domain.

9. The method of claim 7, wherein positions of the individual pilots within each pilot pair are switched by a unit of a prescribed number of subcarriers in a frequency domain.

10. The method of claim 1, wherein locations to which the plurality of pilot pairs is allocated are cyclically shifted in a frequency or time domain.

11. The method of claim 1, wherein power of each pilot pair is boosted using power of data within a same OFDM symbol.

12. The method of claim 1, wherein locations to which the plurality of pilot pairs is allocated are set equal among a plurality of cells providing the same multicast/broadcast service.

13. The method of claim 1, wherein a sequence constructing each of the individual pilots is set equal among a plurality of cells providing the same multicast/broadcast service.

14. The method of claim 1, further comprising allocating data to locations to which the plurality of pilot pairs are not allocated within the resource unit, wherein the data are permutated by a subcarrier pair unit within each OFDM symbol.

* * * * *